US012741867B2

(12) United States Patent
White et al.

(10) Patent No.: US 12,741,867 B2
(45) **Date of Patent: *Sep. 22, 2026**

(54) PROCESS AND APPARATUS FOR CRACKING AMMONIA

(71) Applicant: Air Products and Chemicals, Inc., Allentown, PA (US)

(72) Inventors: Vincent White, Surrey (GB); Andrew Shaw, Sunbury on Thames (GB); Fabrice Amy, Macungie, PA (US)

(73) Assignee: AIR PRODUCTS AND CHEMICALS, INC., Allentown, PA (US)

(*) Notice: Subject to any disclaimer, the term of this patent is extended or adjusted under 35 U.S.C. 154(b) by 532 days.

This patent is subject to a terminal disclaimer.

(21) Appl. No.: 18/205,854

(22) Filed: Jun. 5, 2023

(65) Prior Publication Data

US 2024/0400383 A1 Dec. 5, 2024

(51) Int. Cl.
*C01B 3/047* (2026.01)
*B01J 8/00* (2006.01)
(Continued)

(52) U.S. Cl.
CPC ............. *C01B 3/047* (2013.01); *B01J 8/0005* (2013.01); *B01J 8/062* (2013.01); *B01J 8/067* (2013.01); *C01B 3/508* (2013.01); *B01J 2208/00407* (2013.01); *B01J 2208/00415* (2013.01); *B01J 2208/00477* (2013.01); *B01J 2208/0053* (2013.01); *C01B 2203/0277* (2013.01);
(Continued)

(58) Field of Classification Search
None
See application file for complete search history.

(56) References Cited

U.S. PATENT DOCUMENTS 4,750,986 A * 6/1988 Pinto .................... B01J 19/2425 422/629
5,039,510 A * 8/1991 Pinto ....................... C01B 3/025 423/652
(Continued)

FOREIGN PATENT DOCUMENTS

GB 363600 A 12/1931
GB 2589621 A 6/2021
(Continued)

*Primary Examiner* — John J Figueroa
(74) *Attorney, Agent, or Firm* — Matthew R. Weaver

(57) ABSTRACT

The invention concerns a process and apparatus for cracking ammonia in which heated ammonia at super-atmospheric pressure is partially cracked over a first catalyst in a reaction zone of an electrically heated reactor to produce partially cracked ammonia gas which is then cracked in reactor tubes containing a second catalyst in a fired reactor to produce cracked gas comprising hydrogen gas, nitrogen gas and residual ammonia. The cracked gas is cooled and hydrogen is recovered from the cooled cracked gas in a hydrogen recovery unit. Offgas from the hydrogen recovery unit, or a cracked offgas derived therefrom, provides at least some, preferably all, of the fuel requirement in the fired reactor. Varying the power input to the first part of the cracking reaction enables direct control of the heat flux profile and hence accommodate any excess or shortfall in the heat input from the fired reactor.

11 Claims, 5 Drawing Sheets

(51) Int. Cl.
*B01J 8/06* (2006.01)
*C01B 3/508* (2026.01)

(52) U.S. Cl.
CPC .................. *C01B 2203/043* (2013.01); *C01B 2203/0827* (2013.01); *C01B 2203/085* (2013.01); *C01B 2203/0866* (2013.01); *C01B 2203/1005* (2013.01); *C01B 2203/1258* (2013.01); *C01B 2203/142* (2013.01)

(56) References Cited

U.S. PATENT DOCUMENTS

| | | | | |
|---|---|---|---|---|
| 6,936,363 | B2 | 8/2005 | Kordesch et al. | |
| 7,867,300 | B2 | 1/2011 | Chellappa et al. | |
| 12,421,109 | B2 * | 9/2025 | White | B01J 8/0005 |
| 2024/0166502 | A1 * | 5/2024 | White | C01B 3/047 |
| 2024/0400382 | A1 * | 12/2024 | White | B01J 8/067 |

FOREIGN PATENT DOCUMENTS

| | | | |
|---|---|---|---|
| WO | 2020002326 | A1 | 1/2020 |
| WO | 2021063795 | A1 | 4/2021 |
| WO | 2021257944 | A1 | 12/2021 |
| WO | 2022038230 | A1 | 2/2022 |

* cited by examiner (Reference process)

PROCESS AND APPARATUS FOR CRACKING AMMONIA

TECHNICAL FIELD OF THE INVENTION

The present invention is in the technical field of ammonia cracking to produce hydrogen and relates specifically to a process and apparatus for the production of hydrogen gas from liquid ammonia.

BACKGROUND OF THE INVENTION

Global interest in renewable energy and using this renewable energy to generate "green" hydrogen has driven the interest in converting the "green" hydrogen to "green" ammonia, as ammonia is simpler to transport over distance of hundreds or thousands of miles. Particularly, shipping liquid hydrogen is not commercially possible currently but shipping ammonia, which is in a liquid state, is currently practiced.

For use in a commercial fuel cell, the ammonia must be converted back to hydrogen according to the reaction.

$$2NH_3 \rightleftharpoons 3H_2 + N_2$$

This is an endothermic process, i.e., a process that requires heat, and hence higher temperatures will favor production of the products. The standard heat of reaction (per mole of ammonia) at 1 bar and 0° C. is 45.47 kJ/mol. The endothermic nature of the process dictates the need for a furnace.

The process is known as cracking (or sometimes "dissociation") and is usually performed over a catalyst. The gas produced (or "cracked gas") is a mixture of hydrogen (H2) and nitrogen (N2) gases although, since the cracking reaction is an equilibrium reaction, there is also some residual ammonia. The amount of ammonia in the cracked gas, generally referred to as "ammonia slip", may be varied by changing the temperature and/or the pressure at which the ammonia is cracked with higher temperatures and/or higher pressures favoring conversion thereby reducing the ammonia slip.

In most applications of crackers currently, the hydrogen and nitrogen mixture is utilised as is. However, as ammonia can be a poison to fuel cells, this stream, with ammonia suitably removed such as by scrubbing with water, can be used directly in a fuel cell. However, if the hydrogen is to be used in vehicle fueling, the nitrogen present provides a penalty to the process. The fuel to a vehicle fueling system is compressed to significant pressure—up to 900 bar. This means that the nitrogen, which is merely a diluent in the process, is also compressed, taking power, and taking storage volume and increasing anode gas purge requirement, decreasing efficiency. It is therefore beneficial where hydrogen is to be used in vehicle fueling, for the hydrogen and nitrogen to be separated.

There are many examples of ammonia cracking processes in the art. For example, WO2021/257944A discloses a process in which heated ammonia gas at super-atmospheric pressure is cracked by passing the gas through catalyst-containing reactor tubes in a fired reactor to process a cracked gas which is used to pre-heat the ammonia feed. Hydrogen is recovered from the cooled cracked gas in a pressure swing adsorption ("PSA") device to produce a hydrogen product gas and a PSA tail gas from which hydrogen is recovered using a membrane separation unit. Fuel for the fired reactor is provided by methane (in the form of natural gas or biogas), ammonia and/or PSA tail gas.

It is also known to crack ammonia in an electrically heated reactor. Electrically driven ammonia crackers are typically available at only small scale, i.e., less than 10 tonnes/day of ammonia, and are generally inefficient, typically 20 to 25 kWh/kg H2 due to low product recovery and challenging heat integration. The small-scale crackers are typically operated at low pressure, i.e., less than 10 bar, and high temperature to give low ammonia slip from the cracker. A common use of these small crackers is to produce a stream of N2 and H2 for annealing or creating a reducing atmosphere in a furnace.

Examples of such reactors in the art include the reactors disclosed in GB363300A, GB2589621A, U.S. Pat. No. 6,936,363A, WO2021/063795A and U.S. Pat. No. 7,867,300A.

GB363300A discloses a compact and portable ammonia cracker comprising an annular catalyst chamber surrounding a central electrical heater. In this system, hot cracked gas is used to heat and evaporate liquid ammonia to provide the ammonia feed to the cracker.

GB2589621A discloses an ammonia cracking process in which an inert gas loop is used to heat a reactor containing a metal amide and/or a metal imide for cracking ammonia. The reference mentions that the inert gas in the loop may be heated electrically or by combustion of ammonia.

U.S. Pat. No. 6,936,363A discloses an ammonia cracker to generate hydrogen for a fuel cell. The catalyst bed comprising aluminum oxide pellets onto which an active catalyst metal selected from nickel, ruthenium and platinum is deposited. The catalyst bed is heated either by combustion of a portion of the offgas generated by the hydrogen electrode of the fuel cell and/or by electrical heating.

WO2021/063795A discloses an ammonia cracker including a structured catalyst comprising a catalytically active material supported within a ceramic coating on a macroscopic structure of electrically conductive material. An electrical power supply is used to provide electricity to the electrically conductive material of the structured catalyst and thereby heat the catalytically active material. In some embodiments, a first (upstream) part of the structured catalyst is arranged to generate a first (lower) heat flux and a second (downstream) part of the structured catalyst is arranged to generate a second (higher) heat flux. Hydrogen may be recovered from the resultant cracked gas using a PSA unit.

U.S. Pat. No. 7,867,300A discloses a compact ammonia cracker for use with fuel cells and other apparatus. The cracker has a thermo-catalytic reactor that has a reaction chamber in a combustion chamber. The reaction chamber is loaded with an ammonia decomposition catalyst and is heated either by combustion of ammonia or a hydrocarbon in the combustion chamber, or by an electrical heater such as a battery or a fuel cell.

There is, however, still a need generally for improved processes for the production of hydrogen from ammonia and specifically for processes that are more efficient in terms of energy consumption and/or that have higher levels of hydrogen recovery and/or that reduce or eliminate the need to combust fossil fuels.

BRIEF SUMMARY OF THE INVENTION

According to a first aspect of the present invention, there is provided a process for cracking ammonia comprising providing a heated ammonia gas at super-atmospheric pressure; passing the heated ammonia gas, or a fractionally cracked ammonia gas derived therefrom, over a first catalyst in an electrically heated reactor to cause cracking of ammonia and produce a partially cracked ammonia gas comprising hydrogen gas and nitrogen gas; combusting a fuel with an oxidant gas to heat reactor tubes containing a second catalyst in a fired reactor to produce a flue gas; feeding the partially cracked ammonia gas to the reactor tubes in the fired reactor to cause cracking of further ammonia and produce a cracked gas comprising hydrogen gas, nitrogen gas and residual ammonia gas; cooling the cracked gas to provide cooled cracked gas; and recovering hydrogen from the cooled cracked gas to produce a hydrogen gas product and an offgas comprising nitrogen gas, residual hydrogen gas and residual ammonia gas, wherein the offgas, or a cracked offgas derived therefrom, is used as at least part of the fuel combusted with the oxidant gas.

One advantage of the present invention is that power to the electrically heated reactor may be adjusted to make up any excess or shortfall in the heat input from the fired reactor. In addition, locating the electrically heated reactor upstream of the fired reactor facilitates operation of the process in situations requiring reduced heating duty, e.g., during turndown or start-up where the flow rate of ammonia is reduced, without the need to oversize the reactor.

When compared with a corresponding process in which the fired reactor is upstream of the electrically heated reactor, then the present invention has the advantage that there is a more even tube split (and hence more even pressure drop) between the reactors.

In addition, where the fired reactor is upstream of the electrically heated reactor, the partially cracked ammonia gas is typically heated after it leaves the fired reactor and before it is fed to the electrically heated reactor. However, such heating is typically not required in the present invention, thereby simplifying the process and reducing the total number of heat exchangers which enables savings in both capital and operating costs.

Further, for a given catalyst, the present invention typically requires less catalyst overall, e.g., about 10% less catalyst, than the corresponding process where the fired reactor is upstream of the electrically heated reactor, thereby enabling a further saving in capital cost.

According to a second aspect of the present invention, there is provided apparatus for cracking ammonia comprising:

- an electrically heated reactor for partially cracking heated ammonia gas at super-atmospheric pressure, said electrically heated reactor comprising an inlet for heated ammonia gas at super-atmospheric pressure, a reaction zone comprising a first catalyst, at least one electrical heat source for heating the reaction zone, and an outlet for partially cracked ammonia gas;
- a fired reactor for cracking partially cracked ammonia gas, the fired reactor comprising:
  - a radiant section comprising at least one inlet for fuel and oxidant gas in fluid flow communication with at least one burner, reactor tubes containing a second catalyst having upstream ends in fluid flow communication with an inlet for partially cracked ammonia gas and downstream ends in fluid flow communication with an outlet for cracked gas, wherein the inlet of the radiant section of the fired reactor is in fluid flow communication with the outlet of the electrically fired reactor; and
  - a convection section in fluid flow communication with the radiant section and comprising an outlet for flue gas;
- a hydrogen recovery unit, preferably a PSA unit, for recovering hydrogen gas from cracked gas comprising:
  - a first inlet in fluid flow communication with the cracked gas outlet of the fired reactor;
  - a first outlet for hydrogen gas; and
  - a second outlet for offgas comprising nitrogen gas, residual hydrogen gas and residual ammonia gas in fluid flow communication with the at least one inlet for fuel of the radiant section of the fired reactor,
- wherein the apparatus comprises at least one cooler arranged for cooling cracked gas located between the fired reactor and the hydrogen recovery unit.

The apparatus of the second aspect of the invention is suitable to carry out the process of the first aspect of the invention.

DETAILED DESCRIPTION OF THE INVENTION

Figure 1:
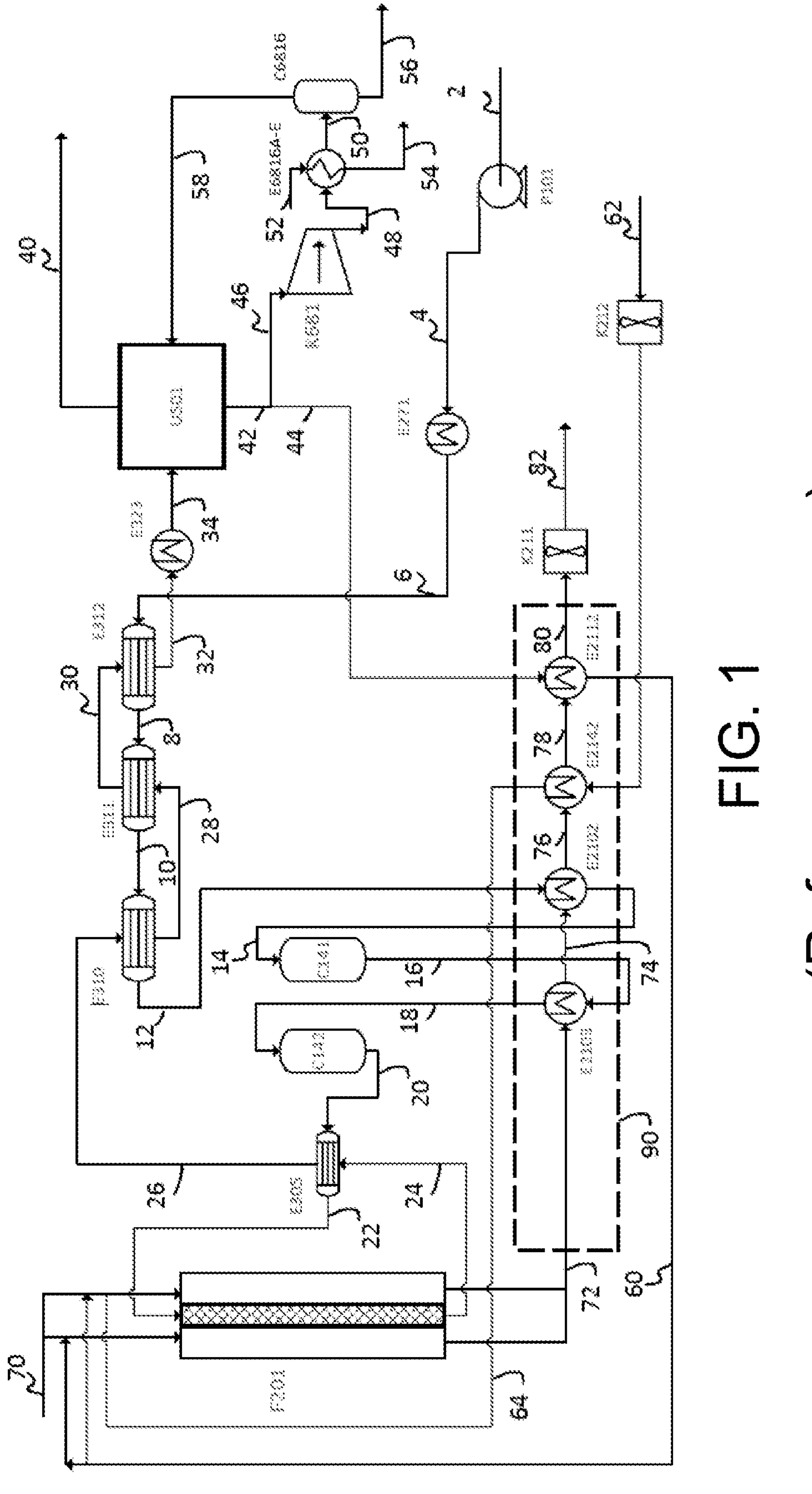
FIG. 1 is a simplified flowsheet of a reference process taken from U.S. Ser. No. 17/990,815 filed on 21 Nov. 2022 (APCI Docket No. 08305 US) in which ammonia is cracked in a fired reactor using natural gas as a fuel.

Amounts of components given in parts per million (or ppm) are calculated by mole unless otherwise stated. In addition, where appropriate from the context, all percentages are calculated by mole unless otherwise stated. Moreover, any references to pressure are references to absolute pressure unless otherwise stated.

In the context of the present invention, the activity of a catalyst will be understood to refer to the rate of conversion of ammonia at a given partial pressure for a given amount of catalyst over a given period of time at a particular temperature and overall pressure. The units used to define the activity of a heterogeneous catalyst are mole of ammonia converted per gram of catalyst (including substrate if present) per second (or mol. g-1 s-1).

The expression "in fluid flow communication" will be understood to mean that piping or other suitable conduits will be used to convey fluid from one specified location to another. During passage between the two locations, the fluid may flow through one or more other units which may be designed and/or arranged to alter the physical condition, e.g., temperature (e.g., a heat exchanger) and/or pressure (e.g., a compressor, a pump, a pressure reduction valve or an expander) of the fluid, or the composition of the fluid through reaction of components within the fluid (e.g., a catalytic reactor). The expression "in direct fluid flow communication" will be understood to mean that the fluid flows directly from the one location to the other, i.e., does not flow through another such unit during its passage and hence there is essentially no change to the composition or physical condition of the fluid.

The term "super-atmospheric pressure" will be understood to mean a pressure that is significantly higher than atmospheric pressure, such as a pressure of at least 5 bar, e.g., a pressure of at least 10 bar, or of at least 20 bar or of at least 30 bar. Typically, the pressure is no more than 60 bar.

The term "upstream" will be understood to mean in the opposite direction to the flow of fluid during normal operation. The term "downstream" will be interpreted accordingly.

The heated ammonia gas feed of the present invention is typically generated from liquid ammonia which may be supplied at ambient pressure from either a pipeline or, more typically, a refrigerated storage tank. Water is often added to ammonia to prevent stress corrosion cracking in the storage tanks, trucks and ships used to transport ammonia. The presence of water in the feed ammonia turns the feed into a multi-component stream, and the evaporation of the feed stream would then require a higher temperature to achieve complete evaporation.

A typical composition of the ammonia feed is shown in Table 1.

TABLE 1

| Component | Composition |
|---|---|
| Ammonia | 99.5-99.8 wt % |
| Maximum water content | 0.5 wt % |
| Minimum water content | 0.2 wt % |
| Oil | 5 ppm max |
| Inerts (e.g., Ar) | <10 ppm |
| Iron | <1 ppm |

Oil may be present in the ammonia due to a boil-off gas compressor used for the ammonia storage, either at the local storage tank, production location, or any other storage tank in between. The presence of oil is an issue because it presents a blockage and/or contamination risk. This may lead to malperformance in the heat exchangers or reduced catalyst activity in the reactors. Therefore, if present, the oil may need to be removed in some way. In this regard, the oil can be removed by passing the liquid ammonia through a bed of activated carbon. However, it would also be possible to a select a particular catalyst for at least the first catalyst in the fired reactor that cracks the oil into shorter chain hydrocarbons which may then react with hydrogen or any water present to form, for example, carbon monoxide, hydrogen, and methane.

Inert gases are not expected to be an issue, other than they could end up in the product hydrogen. In this regard, helium can be present in ammonia derived from natural gas but ammonia from renewable hydrogen will not contain helium.

The liquid ammonia is typically taken from storage and pumped from the storage pressure (e.g., about 1 bar) to a pressure in a range from about 5 bar to about 60 bar, e.g., from about 10 bar to about 50 bar such as from about 10 bar to about 30 bar or from about 40 bar to about 50 bar. The temperature of the liquid ammonia increases slightly from the storage temperature (e.g., about −34° C.) to about −32° C. If liquid ammonia is taken from a pipeline, the temperature of the liquid ammonia is usually higher, e.g., about +10° C.

The pumped liquid ammonia (at super-atmospheric pressure) is then typically pre-heated to its boiling point, ideally by appropriate heat integration within the process. Preferably, part of the pre-heating is achieved using a heat transfer circuit where the heat, e.g., from the intercooling and aftercooling of a PSA off gas compressor, is recovered using a heat transfer fluid such as an aqueous solution of a glycol, e.g., an aqueous solution comprising from about 50 wt. % to about 60 wt. % of a glycol such as ethylene glycol or propylene glycol, optionally together with heat from the flue gas and/or cracked gas, and used to preheat the liquid ammonia. If no such integration is possible, such as if the compressor is not running, then heat from an external source, such as an electric heater, could be required to preheat the ammonia.

The pre-heated liquid ammonia is typically then evaporated, and the resultant ammonia gas heated further prior to being fed to the electrically heated reactor (or indeed the preliminary reactor if part of the ammonia is to be cracked to form fractionally cracked ammonia gas—see below). In this regard, the ammonia gas is typically superheated, i.e., heated to a temperature above its boiling point, to a temperature of more than 350° C. to ensure a useful rate of reaction in the electrically heated reactor.

The duty for the evaporation and further heating of the pre-heated liquid ammonia may be provided by heat exchange with the cracked gas, the flue gas or a combination of both the cracked gas and the flue gas. In preferred embodiments, the cracked gas is used to heat and evaporate the pre-heated liquid ammonia by heat exchange and then the ammonia gas is further heated first by heat exchange with the flue gas and then by heat exchange with the cracked gas.

The flowrate of the liquid ammonia (and hence the heated ammonia gas) is selected to generate the hydrogen product at the required rate. In this regard, the flowrate of liquid ammonia may be in a range from about 2500 kg/h to about 260000 kg/h, or from about 5000 kg/h to about 260000 kg/h, or from about 7500 kg/h to about 50000 kg/h.

In some cases, the heated ammonia gas at super-atmospheric pressure is fed initially to a preliminary reactor so that a fraction, e.g., up to about 20 mol. % or from about 1 mol. % to 15 mol. %, of the ammonia can be cracked over a catalyst to form a fractionally cracked ammonia gas. Any suitable thermo-catalytic reactor may be used as the preliminary reactor such as an adiabatic reactor where the heat of reaction is derived from the cracked gas and/or the flue gas. In addition, any catalyst known for cracking ammonia, e.g., nickel-based catalysts, may be used in the preliminary reactor. Suitable catalysts are discussed below in the context of the first catalyst.

However, the heated ammonia gas is typically fed directly to the electrically heated reactor.

Any catalyst that cracks ammonia may be used as the first catalyst in the reaction zone of the electrically heated reactor. In this regard, a large number of metals are known in the art to catalyze the cracking of ammonia. These metals include transition metals such those in Group 6 of the Periodic Table, e.g., chromium (Cr) and molybdenum (Mo); Group 8, e.g., iron (Fe), ruthenium (Ru) and osmium (Os); Group 9, e.g., cobalt (Co), rhodium (Rh) and iridium (Ir); Group 10, e.g., nickel (Ni), palladium (Pd) and platinum (Pt); and Group 11, e.g., copper (Cu), silver (Ag) and gold (Au). Metalloids such as tellurium (Te) may also be used.

The activity of some of these metals as catalysts for ammonia cracking has been reported by Masel et al (Catalyst Letters, vol. 96, Nos 3-4, July 2004) to vary in the following order:

$$Ru>Ni>Rh>Co>Ir>Fe>>Pt>Cr>Pd>Cu>>Te$$

The metals may be unsupported but are usually supported on a suitable support (or substrate), typically a metal oxide support such as silica ($SiO_2$), alumina ($Al_2O_3$), zirconia ($ZrO_2$) or a mixed metal oxide support such as spinel ($MgAl_2O_4$) or perovskite ($CaTiO_3$). Alternatively, the metal(s) may be supported on a zeolite.

As would be understood by the skilled person, the activity of a supported metal catalyst will typically depend in part on the loading of the catalytically active metal on the support. In this regard, the loading of the metal will vary according to the specific requirements but will typically be in a range from about 0.1 wt % to about 70 wt %. The loading may be towards the lower end of the range, e.g., from about 0.1 wt % to about 10 wt % or from about 0.2 wt % to about 5 wt %, for the more active metals, e.g., ruthenium. For less active metals, e.g., nickel, the loading may be towards the upper end of the range, e.g., from about 20 wt % to about 65 wt %.

Supported metal catalysts may be unpromoted or may be promoted with at least one other metal, e.g., one or more Group 1 metals, e.g., lithium (Li), sodium (Na) and potassium (K); Group 2 metals, e.g., magnesium (Mg) and calcium (Ca), or Group 13 metals, e.g., aluminum (Al), to improve activity as is well known in the art.

Examples of suitable catalysts are disclosed in US2015/0217278A, Masel et al (above), Lamb et al (Int. J. Hydrogen Energy, 44 (2019) pp 3726-3736) and Boisen et al (J. Catalysis 230 (2005) pp 309-312). In addition, bimetallic catalysts, or catalysts containing two catalytically active metals, are also suitable for use with the present invention. Examples include the composite metal or metal alloys or metal nanoclusters supported on perovskites, composite oxides or nitrides, or mixed oxides or mixed nitrides disclosed in US2021/0001311A such as CoNi—MgSrCeO4 and 1 wt % K—CoNi—MgSrCeO4.

The first catalyst may be selected from the group consisting of nickel-based catalysts, ruthenium-based catalysts and iron-based catalysts.

The term "nickel-based catalyst" refers to a catalyst containing nickel as the sole (or at least predominant) catalytically active metal, i.e., the metal responsible for catalyzing the cracking reaction. Nickel may be the only metal in the catalyst or alternatively one or more other metals may be present, e.g., in a material supporting the nickel. The terms "ruthenium-based catalyst" and "iron-based catalyst" are intended to be interpreted accordingly.

As mentioned above, water is usually present in the ammonia as a contaminant. The water may be removed from the ammonia in which case catalysts which do not tolerate water, e.g., iron-based catalysts, may be used in the reactors. However, water is not removed in preferred embodiments to save capital and operational costs and to reduce energy consumption. In these embodiments, catalysts that cannot tolerate water, e.g., iron-based catalysts, are not typically used. Instead, the catalysts in the reactors would be able to tolerate up to 1 mol. % water in the ammonia feed. Such catalysts include nickel-based and ruthenium-based catalysts.

The heated ammonia gas, or the fractionally cracked ammonia gas derived therefrom, may be fed to the electrically heated reactor at a temperature up to about 800° C., provided the material of the reactor walls can withstand the higher temperatures. For lower temperature cycles, the feed is typically at a temperature in a range from about 400° C. to about 600° C., or from about 450° C. to about 550° C., e.g., at about 500° C. For higher temperature cycles, the feed may be at a temperature in the range of about 500° C. to about 800° C., or from about 550° C. to about 700° C., e.g., from about 600° C. to about 650° C. The skilled person would understand that operating at higher temperatures may be desired in embodiments employing nickel-based catalysts.

The electrically heated reactor typically comprises an electrical heat source which heats the walls of a reaction zone holding the first catalyst and provides the heat of reaction necessary for the conversion of ammonia in the heated ammonia gas.

At least a portion, or at least the majority (e.g., over 50%, or over 75%, or over 90%), or all, of the electricity required to power the electrically heated reactor may be generated, e.g., locally, from at least one source of renewable energy, e.g., solar energy, wind energy and/or tidal energy. The entire requirement of electricity may be generated locally from renewable energy. Any remaining portion of the electricity required to power the electrically heated reactor may be taken from hydrocarbon-fueled generators, battery storage and/or the grid as necessary and/or required.

The Inventors have determined that for an electrical cracker to have a lower carbon intensity than a cracker using natural gas as the fuel, the electricity must have a carbon dioxide intensity of no more than about 240 gCO2/kWh, e.g., no more than about 200 gCO2/kWh, or no more than about 190 gCO2/kWh. It has been reported that the carbon intensity of the national grid in some countries, e.g., Austria, France and Sweden, in 2022 already meets this threshold (see https://ourworldindata.org/grapher/carbon-intensity-electricity). The present invention would, therefore, already have particular application in these countries. However, in view of the general trend to reduce the carbon intensity of national grids in recent years, it is expected that the present invention will also have particular application in other countries in the near future.

As mentioned above, the rate of conversion of ammonia over a catalyst depends in part on temperature—as temperature increases, so does the rate of conversion. As the skilled person would appreciate, the temperature at which a cracking process takes place is, however, constrained by the materials used to form the reactor in order to avoid nitriding. Therefore, there is a practical maximum temperature to which the inner walls of the reaction zone of the electrically heated reactor can be heated, and that maximum temperature will depend on the material from which the walls are made. For example, where the material used would begin nitriding at an unacceptable rate at about 700° C., the walls of the reaction zone made from that material may have a maximum inner wall temperature of about 660° C. once an appropriate safety margin is taken into account. Similar constraints are encountered with a fired reactor.

An advantage of the electrically heated reactor over a fired reactor is that the temperature of the inner wall of the reaction zone may be controlled more precisely. Depending on the arrangement of the electrical heat source, it is possible to maintain the entire surface of the wall of the reaction zone that is in contact with the catalyst at an essentially constant temperature or to maintain different temperatures in different locations of the wall or to vary the temperature(s) over time of some part(s) or all of the wall as desired.

The heat flux profile of the electrically heated reactor is initially limited by the practical maximum that can be provided by the electrical heat source. As the reaction progresses and the reaction rate slows, the limiting factor becomes the inner wall temperature of the electrically heated reactor which can be kept at or below the nitriding limit, e.g., about 660° C., by providing the optimal heat flux profile.

In embodiments in which the electrically heated reactor has catalyst-containing reactor tubes, the inner wall temperature of the tubes may be kept substantially constant at or near the maximum temperature, e.g., about 660° C., to maximise conversion of the ammonia within the tubes while keeping nitriding to a minimum, once limits on heat flux are taken into account near the start of the tubes, and lower temperature limits related to high ammonia concentration at the start of the tubes is mitigated by the ammonia cracking reaction proceeding to the point that sufficient hydrogen is present to allow the temperature to be raised to the maximum inner wall temperature, e.g., 660° C. This would be particularly desirable in embodiments in which the first catalyst is a nickel-based catalyst. If a more active catalyst, e.g., a ruthenium-based catalyst, is used as the first catalyst, then it would be possible to operate the electrically heated reactor at a lower temperature to take advantage of the increased activity of the catalyst.

Heat transfer from the electrical heat source to the process can be radiative and/or conductive and/or convective via heating a transfer fluid. Preferably, heat transfer is radiative by resistive heating elements placed so as to provide the required heat flux to the reaction zone, e.g., the catalyst-containing tubes.

The partially cracked ammonia gas typically has a mole fraction of ammonia of at least about 5 mol. %, or at least about 10 mol. % or at least about 15 mol. %. The mole fraction of ammonia in the partially cracked gas is typically no more than about 50 mol. %, or no more than about 30 mol. %, or no more than about 20 mol. %, e.g., from about 15 mol. % to about 20 mol.

Should the temperature of the partially cracked ammonia gas be too low, e.g., below 600° C., for direct feeding to the tubes of the fired reactor, then the gas may be heated to the required temperature before being fed to the fired reactor. In this regard, the partially cracked ammonia gas may be heated electrically and/or by heat exchange with the cracked gas.

However, the temperature of the partially cracked ammonia gas on exit from the electrically heated reactor is typically sufficiently high for the gas to be fed directly, e.g., without heating, to the catalyst-containing reactor tubes of the fired reactor. In this regard, the partially cracked ammonia gas may be at a temperature in a range from about 600° C. to about 660° C.

The combustion process in the fired reactor is at least partially, and preferably entirely, fueled internally using offgas generated during recovery of hydrogen from the cracked gas, or a cracked offgas derived therefrom. In this regard, the fired reactor is typically sized for combustion of the offgas, or the cracked offgas, only. That said, a trim fuel such as ammonia or methane, preferably derived from biogas or from methanation of renewable hydrogen, may be used to supplement the offgas or cracked offgas. It is generally desirable, however, to minimize, or even eliminate, the use of such a trim fuel to reduce the carbon intensity of the process.

The oxidant gas is typically air but may be an oxygen-enriched gas or pure oxygen as appropriate.

Any catalyst that cracks ammonia may be used as the second catalyst in the reactor tubes of the fired reactor. Suitable catalysts are discussed above in the context of the first catalyst. The first catalyst and the second catalyst may be different in terms of the identity of the catalytically active metal and/or the identity of any support and/or the loading of the catalytically active metal. However, the first and second catalysts may comprise the same catalytically active metal, e.g., nickel. Indeed, in preferred embodiments, the first and second catalysts are identical, e.g., the same nickel-based catalyst is used as the first and second catalysts.

The flame(s) of the burner(s) heat the catalyst-containing tubes of the fired reactor and hence provide heat of reaction for the conversion of the partially cracked ammonia gas. As with the electrically heated reactor, there is a practical maximum temperature to which the tubes may be heated so as to avoid significant nitriding.

The temperature of the inner wall of the tubes in the fired reactor will typically decrease along the length of the tubes as the distance from the flame(s) increases. However, the temperature of the inner wall will usually be in a range from about 400° C. to about 800° C., e.g., from about 500° C. to about 700° C.

The fired reactor and the electrically heated reactor may be provided within the same thermally insulated unit. For example, the heated ammonia gas, or the fractionally cracked ammonia gas derived therefrom, may be passed through a single set of catalyst-containing reactor tubes comprising a first section and a second section located downstream of the first section, wherein the first section of the reactor tubes is heated in the electrically heated reactor and the second section of the reactor tubes is heated in the fired reactor. In this case, the fired reactor and the electrically heated reactor may advantageously be in the same thermally insulated unit to maximise the effective use of the heat and minimize heat loss.

However, the electrically heated reactor and fired reactor are typically in separate thermally insulated units. In these embodiments, the partially cracked ammonia gas is fed from the electrically heated reactor in a first thermally insulated unit to the fired reactor in a second thermally insulated unit.

As mentioned above, any residual (or uncracked) ammonia in the cracked gas is generally referred to as "ammonia slip". The cracked ammonia typically has a mole fraction of ammonia of at least about 0.1 mol. %, or at least about 1 mol. %. The mole fraction of ammonia in the cracked gas is typically no more than about 5 mol. %. However, the cracking temperature and pressure typically dictate that the ammonia slip from the electrically heated reactor is no more than 3 mol. % or no more than 2 mol. %, e.g., from about 0.5 mol. % to about 1.5 mol. %.

The energy required to crack the heated ammonia gas is split between the different reactors and the split will typically depend on the extent to which hydrogen is recovered from the cracked gas. Nevertheless, from about 20% to about 80%, or from about 25% to about 50%, is typically provided by the combustion of the offgas (or cracked offgas) in the fired reactor. In embodiments with high hydrogen recovery, e.g., up to about 95%, and low ammonia slip, e.g., from about 1.3 mol. % to about 1.5 mol. %, from about 30% to about 35% of the energy required in the process to crack the heated ammonia gas is typically provided in the fired reactor.

In preferred embodiments, the remainder of the energy requirement to crack the heated ammonia is provided by the electrical heating in the electrically heated reactor.

The heat from the cracked gas and the flue gas is typically used to heat the feed streams to the electrically heated reactor, thereby reducing the overall energy consumed by the process. In this regard, the temperature of the cracked gas may be up to about 700° C., e.g., typically from about 600° C. to about 680° C., or from about 620° C. to about 655° C., e.g., from about 620° C. to about 630° C. or from about 645° C. to about 650° C. The temperature of the flue gas on exit from the fired reactor may be up to about 750°

C. However, the temperature drops due to heat leak and is typically from about 625° C. to about 700° C., e.g., from about 640° C. to about 650° C. or from about 690° C. to about 700° C., on entry into the convection section.

The offgas from the hydrogen recovery unit contains residual ammonia in an amount, e.g., from about 1 mol. % to about 10 mol. %, e.g., from about 3 mol. % to about 5 mol. %. The residual ammonia in the offgas may be combusted with the oxidant gas in the burner(s) of the fired reactor, i.e., the offgas is used as the fuel in the fired reactor without cracking the residual ammonia.

In some embodiments, however, ammonia in the offgas is cracked in an offgas cracker to produce the cracked offgas to aid combustion in the fired reactor. In this regard, the offgas may be heated and then passed through in an adiabatic reactor comprising at least one bed of catalyst.

In such embodiments, the offgas is typically heated by an electrical heater and/or by heat exchange in at least one heat exchanger against cracked gas and/or flue gas. Typically, the offgas is heated by heat exchange against the flue gas. The temperature of the resultant heated offgas may be from about 575° C. to about 625° C., e.g., from about 590° C. to about 600° C. In addition, the pressure of the offgas may be increased by a blower, a compressor or a booster, if desired.

Any of the catalysts described above may be used in the bed(s) of the adiabatic reactor although, in preferred embodiments, the catalyst is a nickel-based catalyst, e.g., the same nickel-based catalyst used in electrically heated reactor and/or the fired reactor.

At least about 90 mol. % and up to about 98 mol. %, e.g., from about 90 mol. % to about 94 mol. %, of the ammonia in the offgas is typically cracked in the offgas cracker.

Figure 3:
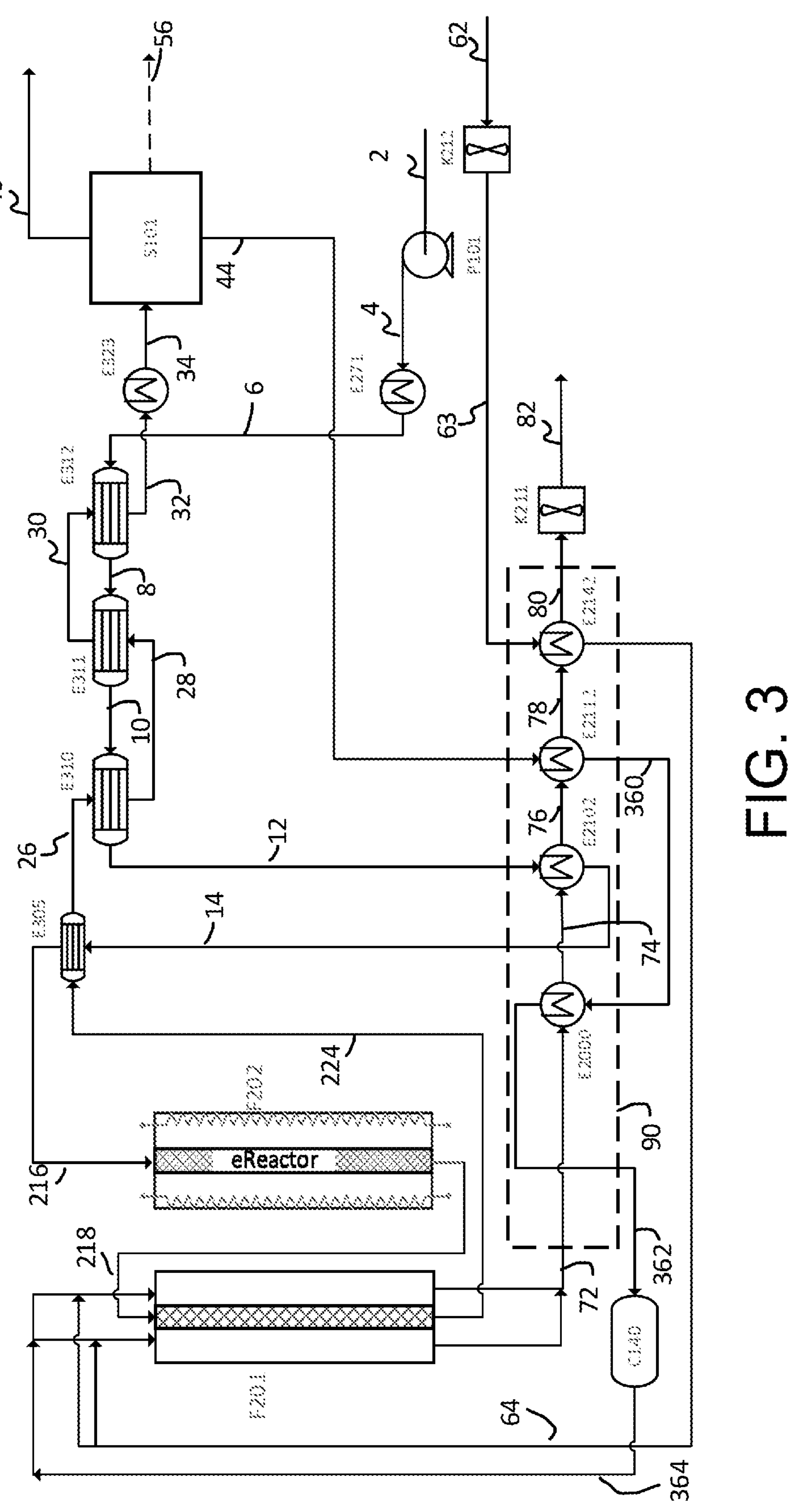
FIG. 3 is a simplified flowsheet of a second embodiment of the process according to the present invention with offgas cracking.

Cracking the ammonia contained in the offgas means that, rather than cracking the ammonia in the flames of the burners in the fired reactor, the majority of the cracking is now performed outside of the main combustion reaction. Since cracking is an endothermic reaction, the flame from the combustion of the cracked gas will be hotter, leading to more energy going into the process-side reaction and not being used to crack the fuel ammonia. In some cases, a duct burner may be used to heat the flue gas before cracking the offgas but typically the process can be configured so as not to require a duct burner, as shown in FIG. 3.

Separating the fuel to provide a stream to the burners and other stream to the duct burner allows better control of the combustion temperature but increases the complexity of fuel and air supply as both need to be regulated to the duct burner and the main process burners. Duct burners allow the temperature of the flue gas being used to heat the offgas before the offgas cracker to be hotter (typically up to about 950° C., e.g., in a range from about 850° C. to about 920° C., or from about 875° C. to about 900° C.) allowing the offgas to be hot enough to enable the use of lower cost nickel-based catalyst rather than expensive ruthenium-based catalyst. However, even without the duct heater, the offgas may be hot enough to use the lower cost nickel-based catalyst, e.g., in a range from about 550° C. to about 650° C., typically about 595° C. (which is the temperature in FIG. 3).

Recovery may be achieved in any suitable hydrogen recovery process, including a pressure swing adsorption (PSA) process or by using one or more selectively permeable membranes or by partial condensation and phase separation, or by way of a combination of at least two of these processes, e.g., PSA and membrane separation. In preferred embodiments, hydrogen recovery is achieved in a PSA process alone, i.e., without use of membrane separation or partial condensation and phase separation. In embodiments, an PSA offgas comprising nitrogen gas, residual ammonia and residual hydrogen is generated.

The rate of recovery of hydrogen in the hydrogen recovery process is typically at least 85%, or at least 90%. Since residual hydrogen in the offgas is used as fuel for the burner(s) in the fired reactor, there is typically an upper limit to the hydrogen recovery rate dictated by the cracking process, in addition to a practical upper limit dictated by the hydrogen recovery process itself. With these factors in mind, the upper limit is typically about 95%, e.g., 95%±2%.

As acknowledged above, electrical crackers are known for use in producing hydrogen gas from ammonia albeit on a significantly smaller scale than the present invention. In this regard, the hydrogen product is typically produced by the process of the present invention at a rate in a range from about 10 tonnes/day to about 1000 tonnes/day, or from about 20 tonnes/day to about 1000 tonnes/day, or from about 30 tonnes/day to about 200 tonnes/day.

Several factors influence the carbon intensity of cracking processes and two of these factors are the amount of ammonia allowed to slip through the cracker and nature and amount of the fuel combusted in the cracker. In this regard, the inventors have determined that an appropriate balance between these factors may be achieved if the ammonia slip in the cracked gas is in a range from about 1 mol. % to about 2 mol. %, and ideally from about 1.3 mol. % to about 1.5 mol. %, and if the rate of hydrogen recovery from the cracked gas is in a range from about 90% to about 95%, and ideally about 95% or as close to 95% as possible, with the remaining hydrogen in the offgas and hence used as fuel in the fired reactor.

Regarding the apparatus, any design of electrically heated reactor is in principle suitable for use with the present invention. In this connection, the electrically heated reactor may be in the form of a catalytic bed reactor, catalyst-containing reactor tubes, a catalyst-coated plate reactor, a catalyst-coated tube reactor or a catalyst-coated flow channel reactor. However, in preferred embodiments, the electrically heated reactor has catalyst-containing reactor tubes and may have a "box" design or a "can" design (see below).

The electrical heat source can be in the form of one or more resistive heaters and/or inductive heaters and/or microwave generators. The electrically heated reactor is typically a radiant reactor and the electrical heat source is at least one resistive heating element.

Any design of fired reactor is in principle suitable for use with the present invention. That said, the fired reactor is typically a top-fired furnace although a bottom-fired furnace may alternatively be used. Accordingly, the outlet of the reactor tubes may be at the top or bottom of the tubes.

The fired reactor may have a "box" design or a "can" design. In a box design, the tubes are arranged in an array comprising a number of, e.g., two or more, rows and the burners are located to direct the flames between the tubes within the array and on the outside of the first and last row. The burners in these rows are sometimes referred to as "side lane burners" and are usually rated to be about 70% of the duty of the burners located between rows of tubes. The array of tubes and burners is contained within a rectangular walled enclosure. Such a design is typically used for fired reactors intended to process larger gas flows and hence such reactors will typically have at least 20 tubes, e.g., from 40 to 500 tubes or from 40 to 100 tubes. In a can design, the tubes are arranged around a central burner. This configuration is typically preferred if the gas flow is considered low enough and hence such reactors will typically have no more than 36 tubes, e.g., from 12 to 25 tubes.

The cooler(s) for cooling the cracked gas typically comprise at least one heat exchanger arranged for cooling the cracked gas by heat exchange against ammonia to help provide the heated ammonia gas feed to the electrically heated reactor.

Any suitable design of heat exchanger may be used although a shell-and-tube type heat exchanger is typically preferred. In such preferred embodiments for a cracked gas cooler, the cracked gas may pass through the tube-side of the heat exchanger and the ammonia gas feed may pass through the shell-side or vice versa.

The electrically heated reactor and the fired reactor may be within the same thermally insulated unit to maximise effective use of the heat and minimize heat loss. For example, a single set of catalyst-filled reactor tubes may have a first section and a second section downstream of the first section, with the first section being the reaction zone of the electrically heated reactor and the second section located within the radiant section of the fired reactor.

However, the electrically heated reactor and the fired reactor are typically in separate thermally insulated units. In this regard, the reactors are typically easier to manufacture separately. In addition, separate units typically provide better access for maintenance and inspection.

The hydrogen recovery unit may comprise a PSA unit (with or without a PSA recycle compressor), one or more selectively permeable membrane units, or a partial condensation and phase separation unit, or a combination of two or more of these types of units such as a PSA unit and one or more membrane units. In preferred embodiments, the hydrogen recovery unit is a PSA unit.

The apparatus may comprise an adiabatic reactor comprising an inlet in fluid flow communication with the outlet of the second outlet of the hydrogen recovery unit, a catalyst bed having an upstream end in fluid flow communication with the inlet and a downstream end in fluid flow communication with an outlet for cracked offgas which is in fluid flow communication with the at least one inlet for fuel in the radiant section of the fired reactor.

The catalyst in the bed of the adiabatic reactor may be any suitable catalyst for cracking ammonia as described above in the context of the first catalyst. In preferred embodiments, however, the catalyst is a nickel-based catalyst, e.g., the same nickel-based catalyst as the first and second catalysts.

In embodiments comprising an adiabatic reactor for cracking ammonia in the offgas, the apparatus may further comprise a duct burner for raising the temperature of the flue gas. Heat from the heated flue gas may then be transferred to the offgas by heat exchange to provide necessary heat of reaction to crack the ammonia in the adiabatic reactor.

Due to the high ammonia concentration in the feed gas, the cracking reactors, e.g., the shell and tubes of both the fired reactor and the electrically heated reactor, are typically constructed from materials resistant to ammonia and/or nitriding, particularly where higher cracking temperatures are used. Suitable materials include nickel-based alloys comprising at least 40 wt. % or at least 50 wt. % nickel. Such alloys typically have no more than 90 wt. %, or no more than 80 wt. % nickel. The alloys will typically comprise one or more other metals selected from chromium, cobalt, molybdenum and iron.

Specific examples of suitable nickel-based alloys include UNS N06600, N06625, N06601, N06617, N06025, N06230, N07214, N08811. In some embodiments, austenitic nickel-chromium based superalloys such as Inconel may be used.

The unified numbering system (UNS) is an alloy designation system that is widely accepted in North America. Each UNS number relates to a specific metal or alloy and defines its specific chemical composition, or in some cases a specific mechanical or physical property.

Other suitable materials include cobalt-based alloys such as UNS R30188. In addition, high temperature alloys that are less resistant to ammonia nitriding, such as UNS N08811 or cast alloys such as HPNb, HP Micro-Alloyed, MA-1 (MetalTek International, USA), may be suitable, particularly when surface modified or coated by a corrosion resistant layer such as aluminization; aluminization and then pre-oxidation; or a ceramics coating. Nitriding resistant alloys can also be used with surface modification or coating for improved performance.

Aspects of the invention include:

#1. A process for cracking ammonia comprising:
- providing a heated ammonia gas at super-atmospheric pressure;
- passing the heated ammonia gas, or a fractionally cracked ammonia gas derived therefrom, over a first catalyst in an electrically heated reactor to cause cracking of ammonia and produce a partially cracked ammonia gas comprising hydrogen gas and nitrogen gas;
- combusting a fuel with an oxidant gas to heat reactor tubes containing a second catalyst in a fired reactor to produce a flue gas;
- feeding the partially cracked ammonia gas to the reactor tubes in the fired reactor to cause cracking of further ammonia and produce a cracked gas comprising hydrogen gas, nitrogen gas and residual ammonia gas;
- cooling the cracked gas to provide cooled cracked gas; and
- recovering hydrogen from the cooled cracked gas to produce a hydrogen gas product and an offgas comprising nitrogen gas, residual hydrogen gas and residual ammonia gas, wherein the offgas, or a cracked offgas derived therefrom, is used as at least part of the fuel combusted with the oxidant gas.

#2. A process according to #1, wherein the partially cracked ammonia gas is fed directly from the electrically heated reactor to the reactor tubes of the fired reactor.

#3. A process according to #1 or #2, wherein the partially cracked ammonia gas has a mole fraction of ammonia in a range from about 5 mol. % to about 50 mol. %, or from about 10 mol. % to about 30 mol. %, or from about 15 mol. % to about 20 mol. %.

#4. A process according to any of #1 to #3, wherein the cracked gas has a mole fraction of ammonia in a range from 0.1 mol. % to about 5 mol. %, or from about 1 mol. % to about 2 mol. %, or about 1.3 mol. % to about 1.5 mol. %.

#5. A process according to any of #1 to #4, wherein from about 20% to about 80%, or from about 25% to about 50%, or from about 30% to about 35%, of the energy required in the process to crack the heated ammonia gas is provided by the combustion of the offgas, or of the cracked gas derived therefrom, in the fired reactor.

#6. A process according to #5, wherein the remainder of the energy required in the process to crack the heated ammonia gas is provided by the electrical heating in the electrically heated reactor.

#7. A process according to any of #1 to #6, wherein the first and second catalysts are identical and from about 20% to about 90%, or from about 50% to about 90%, or from about 50% to about 75%, or from about 55% to about 65%, of the total catalyst volume is located in the electrically heated reactor.

#8. A process according to any of #1 to #7, wherein the heated ammonia gas is cracked in reactor tubes containing the first catalyst.

#9. A process according to any of #1 to #8, wherein the heated ammonia gas, or the fractionally cracked ammonia gas derived therefrom, is passed through a single set of catalyst-containing reactor tubes comprising a first section and a second section located downstream of the first section, wherein the first section of the reactor tubes is heated in the electrically heated reactor and the second section of the reactor tubes is heated in the fired reactor.

#10. A process according to any of #1 to #9, wherein the electrically heated reactor heats radiatively using at least one resistive heating element.

#11. A process according to any of #1 to #10, wherein the offgas, or the cracked offgas gas derived therefrom, provides the entire fuel requirement of the fired reactor.

#12. A process according to #1 to #11, wherein the offgas is cracked in an adiabatic reactor comprising at least one catalyst bed to produce the cracked offgas which is then fed as the fuel to the fired reactor.

#13. A process according to #1 to #12, wherein the hydrogen product gas is produced at a rate in a range from about 10 tonnes/day to about 1000 tonnes/day, or from about 20 tonnes/day to about 1000 tonnes/day, or from about 30 tonnes/day to about 200 tonnes/day.

#14. A process according to any of #1 to #13, wherein at least a portion, or at least the majority, or all, of the electricity used to power the electrically heated reactor has a carbon dioxide intensity of no more than about 240 gCO2/kWh, or no more than 200 gCO2/kWh, or no more than about 190 gCO2/kWh.

#15. A process according to any of #1 to #14, wherein at least a portion, or at least the majority, or all, of the electricity used to power the electrically heated reactor is generated from at least one source of renewable energy.

#16. Apparatus for cracking ammonia comprising:

an electrically heated reactor for partially cracking heated ammonia gas at super-atmospheric pressure, said electrically heated reactor comprising an inlet for heated ammonia gas at super-atmospheric pressure, a reaction zone comprising a first catalyst, at least one electrical heat source for heating the reaction zone, and an outlet for partially cracked ammonia gas;

a fired reactor for cracking partially cracked ammonia gas, the fired reactor comprising:

a radiant section comprising at least one inlet for fuel and oxidant gas in fluid flow communication with at least one burner, reactor tubes containing a second catalyst having upstream ends in fluid flow communication with an inlet for partially cracked ammonia gas and downstream ends in fluid flow communication with an outlet for cracked gas, wherein the inlet of the radiant section of the fired reactor is in fluid flow communication with the outlet of the electrically fired reactor; and a convection section in fluid flow communication with the radiant section and comprising an outlet for flue gas;

a hydrogen recovery unit, preferably a PSA unit, for recovering hydrogen gas from cracked gas comprising:

a first inlet in fluid flow communication with the cracked gas outlet of the fired reactor;

a first outlet for hydrogen gas; and a second outlet for offgas comprising nitrogen gas, residual hydrogen gas and residual ammonia gas in fluid flow communication with the at least one inlet for fuel of the radiant section of the fired reactor, wherein the apparatus comprises at least one cooler arranged for cooling cracked gas located between the fired reactor and the hydrogen recovery unit.

#17. An apparatus according to #16, wherein the at least one cooler comprises at least one heat exchanger arranged for cooling cracked gas by heat exchange against ammonia.

#18. An apparatus according to #16 or #17, wherein the inlet of the radiant section of the fired reactor is in direct fluid flow communication with the outlet of the electrically fired reactor.

#19. An apparatus according to any of #16 to #18, wherein the first and second catalysts are the same catalyst and about 50% to about 90%, or from about 50% to about 75%, or from about 55% to about 65%, of the total catalyst volume is located in the electrically heated reactor.

#20. An apparatus according to any of #16 to #19, wherein the reaction zone of the electrically heated reactor comprises reactor tubes filled with the first catalyst.

#21. An apparatus according to any of #16 to #20, wherein the electrically heated reactor and the fired reactor are in separate thermally insulated units.

#22. An apparatus according to any of #16 to #20, wherein the electrically heated reactor and the fired reactor are within the same thermally insulated unit.

#23. An apparatus according to any of #16 to #22, wherein the reaction zone of the electrically heated reactor is a first section of a single set of catalyst-filled reactor tubes which comprise a second section downstream of the first section, the second section being the reactor tubes in the radiant section of the fired reactor.

#24. An apparatus according to any of #16 to #23, wherein the electrical heat source is a radiant heat source comprising at least one resistive heating element.

#25. An apparatus according to any of #16 to #24 comprising an adiabatic reactor comprising an inlet in fluid flow communication with the outlet of the second outlet of the hydrogen recovery unit, a catalyst bed having an upstream end in fluid flow communication with the inlet and a downstream end in fluid flow communication with an outlet for cracked offgas, said cracked offgas outlet being in fluid flow communication with the at least one inlet for fuel in the radiant section of the fired reactor.

The invention will now be described by way of example only with reference to the figures.

In FIG. 1, a stream 2 of liquid ammonia at about −32° C. is removed from storage (not shown) and fed to a pump P101 where it is pumped to produce a stream 4 of pressurised liquid ammonia at a pressure of about 46 bar which is pre-heated by heat exchange with a heat transfer fluid which in this case is an aqueous solution of a glycol, typically about 55 wt. % ethylene glycol or propylene glycol, in heat exchanger E271 to produce stream 6 of pre-heated liquid ammonia at about 55° C. An electric heater may be used to ensure that the temperature of the glycol solution being fed to the heat exchanger E271 is sufficient to pre-heat the liquid ammonia to the required temperature.

The pre-heated liquid ammonia in stream 6 is further heated by heat exchange in heat exchanger E312 to produce a stream 8 of further heated liquid ammonia. The further heated liquid ammonia in stream 8 is then evaporated by heat exchange in heat exchanger E311 to produce a stream 10 of ammonia vapor. The ammonia vapor in stream 10 is then superheated by heat exchange in heat exchanger E310 to produce a stream 12 of heated ammonia gas at about 260° C.

The heated ammonia gas in stream 12 is further heated by heat exchange in heat exchanger E2102 to produce a stream 14 of superheated ammonia gas at about 420° C. For convenience, heat exchanger E2102 is indicated as a single unit. However, there may be in reality two separate heat exchangers with a selective catalytic reactor (SCR) located in between.

The superheated ammonia gas in stream 14 is fed at about 420° C. and about 43 bar to a first adiabatic reactor vessel C141 and passed through a bed of ruthenium-based catalyst. Some of the ammonia gas is cracked over the catalyst to form a stream 16 of intermediate gas that contains some cracked ammonia. The mole fraction of ammonia in the gas passing through the first adiabatic reactor vessel C141 drops from almost 1 to about 0.9.

The intermediate gas is at about 360° C. before being heated by heat exchange in heat exchanger E2103 to produce a stream 18 of superheated intermediate gas which is then fed at about 590° C. to a second adiabatic reactor vessel C142 and passed through a bed containing an upstream layer of nickel-based catalyst and a downstream layer of a ruthenium-based catalyst to produce a stream 20 of partially cracked ammonia gas. The mole fraction of ammonia in the gas passing through the second adiabatic reactor vessel C142 drops from about 0.9 to about 0.6.

The catalyst bed of the second adiabatic reactor vessel C142 has two layers—a layer of nickel-based catalyst over a layer of ruthenium-based catalyst to use the heat more efficiently and hence maximize ammonia conversion. The catalyst volumes are also optimized, i.e., minimizing the volume of the ruthenium-based catalyst by limiting the exit temperature of the second adiabatic reactor vessel to about 390° C. The Inventors found that reducing this temperature any further increases the volume required of the ruthenium-based catalyst.

The ruthenium-based catalyst is the same in both the first and second adiabatic reactor vessels. However, different ruthenium-based catalysts may be used.

The partially cracked ammonia in stream 20 is heated by heat exchange in a heat exchanger (or "economizer") E305 prior to being fed as stream 22 at a pressure of about 38 bar to catalyst-filled tubes in the radiant section F201 of a furnace (or reactor). Heating the feed to the tubes increases the amount of cracking that can be done with the heat from the burners by reducing the duty required to heat the partially cracked stream to the reaction temperature. Utilizing the cracked stream from the tubes allows efficient use of this high temperature stream. The inlet temperature of the direct fired tube furnace is limited to about 500° C. to limit the inner wall temperature of the cracker tubes.

A stream 62 of air passed through forced draft fan K212 before being pre-heated by heat exchange in heat exchanger E2142 to produce a stream 64 of pre-heated air. The pre-heated air of stream 64 is fed to the burners (not shown) of the furnace F201 alongside a stream 70 of natural gas as trim fuel. Pre-heating the air in this way helps reduce the fuel requirement.

The tubes in the radiant section F201 of the furnace are filled with two types of ammonia cracking catalysts in two different layers. A ruthenium-based catalyst is used in the first layer within each tube so that the faster reaction rate allows the metals temperature to be kept to within the design limit of about 660° C. The second layer in the tubes, downstream of the first layer, contains a lower cost but less active nickel-based catalyst.

A stream 24 of cracked gas exits the radiant section F201 of the direct fired tube furnace at about 640° C. and is then fed to economizer E305 to provide the duty required to heat the partially cracked ammonia, thereby reducing the temperature of the cracked gas to about 530° C.

The economizer E305 is depicted as a shell-and-tube style heat exchanger with the partially cracked ammonia gas passing through the tubes and the cracked gas passing through the shell side. However, this arrangement could be reversed or indeed a different style of heat exchanger could be used.

A stream 26 of cracked gas is then fed from the economizer E305 to heat exchanger E310 to provide the duty required to superheat the ammonia gas, thereby further reducing the temperature of the cracked gas to about 389° C.

A stream 28 of cracked gas is then fed from heat exchanger E310 to heat exchanger E311 to provide the duty required to evaporate the further heated liquid ammonia, thereby reducing the temperature of the cracked gas even further to about 109° C.

A stream 30 of cracked gas is then fed from heat exchanger E311 to heat exchanger E312 to provide the duty required to further heat the heated pressurized liquid ammonia, thereby reducing the temperature of the cracked gas further again to about 70° C.

Each of the heat exchangers E310, E311 and E312 is depicted as an individual shell-and-tube style heat exchanger with the ammonia passing through the tubes and the cracked gas passing through the shell side. However, this arrangement could be reversed for at least one, e.g., all, of these heat exchangers. Alternatively, the heat exchangers could be combined into a single shell-and-tube style heat exchanger or indeed a different style of heat exchanger could be used.

A stream 32 of cracked gas from heat exchanger E312 is then cooled further by heat exchange with the heat transfer fluid in cooler E323 and then fed as stream 34 to PSA system U501 where it is separated into a stream 40 of hydrogen gas which is removed as product, and a stream 42 of PSA offgas comprising nitrogen gas, residual hydrogen gas and residual ammonia gas. The hydrogen gas in stream 40 may be fed to a hydrogen liquefaction unit (not shown) to produce liquid hydrogen.

All of the PSA offgas in stream 42 may be sent directly as fuel (stream 60) for combustion in the furnace F201. Alternatively, stream 42 may be divided into divided into two portions.

A first portion of the PSA offgas in stream 44 is heated by heat exchange in a heat exchanger E2112 to produce a stream 60 of warmed PSA offgas which is then fed to the burners in the furnace F201, together with air feed 64 and, optionally the natural gas feed 70 as required. A minimum amount of natural gas is used as trim fuel to provide the balance of fuel required in the fired section.

A second portion may be sent as stream 46 to a multistage compression unit K681 for compression. The compression unit K681 has five stages with an intercooler between each stage, together with an aftercooler following the last stage. Heat is recovered from the compressed gas in the intercoolers and the aftercooler by heat exchange with the heat transfer fluid. Heat may also be recovered from the lube oil used in the compression unit and, where a positive displacement compression unit is used, from the cylinder(s) of the compression unit using the heat transfer fluid.

For convenience, the intercoolers and aftercooler are indicated by a single heat exchanger (labelled as E6816A-E) that recovers heat from a stream 48 of compressed PSA offgas by heat exchange with a stream 52 of the heat transfer fluid to produce a stream 50 of cooled compressed PSA offgas and a stream 54 of warmed heat transfer fluid.

The heat transfer fluid warmed in the cooler E323 and in the intercoolers and aftercooler E6816A-E is then used to provide the duty required to preheat the liquid ammonia by heat exchange in heat exchanger E271.

The cooled compressed PSA offgas in stream 50 is fed to a phase separator C6816 in which any condensate is removed as stream 56. The compressed PSA offgas is then recycled to the PSA system U501 as stream 58 to recover further hydrogen. In this way, the recovery of hydrogen may be increased from 85% (without the recycle) to 95% (with the recycle).

As indicated above, the process can be operated without compression unit K681, resulting in lower hydrogen recovery in the PSA unit 501. Reducing hydrogen recovery will obviously result in less hydrogen gas product. However, reduced hydrogen recovery may still be desirable as the carbon intensity (CI) for the process is lowered as more hydrogen would be in the offgas thereby reducing the requirement for natural gas as trim fuel and reducing carbon dioxide emissions.

A stream 72 of flue gas at about 686° C. passes from the radiant section F201 to the convection section 90 of the furnace F201 where it first provides the duty required to heat the intermediate gas from stream 16 in heat exchanger E2103 thereby reducing the temperature of the flue gas which is then used (as stream 74) to provide the duty required to further heat the heated ammonia gas from stream 12 in heat exchanger E2102 thereby reducing the temperature of the flue gas further. Therefore, the flue gas provides heating duty in a direction countercurrent to the flow of feed gas to the radiant section F201 of the direct fired tube furnace.

The cooled flue gas is then used (as stream 76) to provide the duty required to heat the air from stream 62 in heat exchanger E2142 thereby reducing the temperature of the flue gas further. The further cooled flue gas is then used (as stream 78) to provide the duty required to heat the PSA offgas from stream 44 in heat exchanger E2112 thereby cooling the flue gas further.

The cooled flue gas leaves the convection section 90 of the direct fired tube furnace F201 as stream 80 at a temperature of about 121° C., i.e., above the dew point of water, passes through an induced draft fan K211 and then leaves the process as stream 82. All of the practical energy has been extracted from the flue gas at this point which may now be vented to atmosphere, optionally after further processing if required depending on its composition.

Oil may be present in the liquid ammonia in an amount up to about 5 ppm from boil-off gas compressors (not shown) used with ammonia storage tanks (not shown), either at the location where the ammonia is produced, or onsite where the ammonia is cracked, or indeed anywhere in transit between the two sites. The presence of oil in the ammonia may cause difficulties as the ammonia cracking catalysts may not tolerate the oil. Thus, it may be desirable to remove the oil before the ammonia is exposed to the catalysts. Oil may be removed by passing the ammonia through a bed of activated carbon or other suitable adsorbent.

If oil is to be removed from the ammonia, then an oil removal unit (not shown) may be located in stream 2 (i.e., in the feed line to the pump P101), in stream 4 (i.e., between pump P101 and glycol heater E271), in stream 6 (i.e., between glycol heater E271 and heat exchanger E312), in stream 8 (i.e., between heat exchangers E312 and E311) or in stream 10 (i.e., between heat exchangers E311 and E310).

Figure 2:
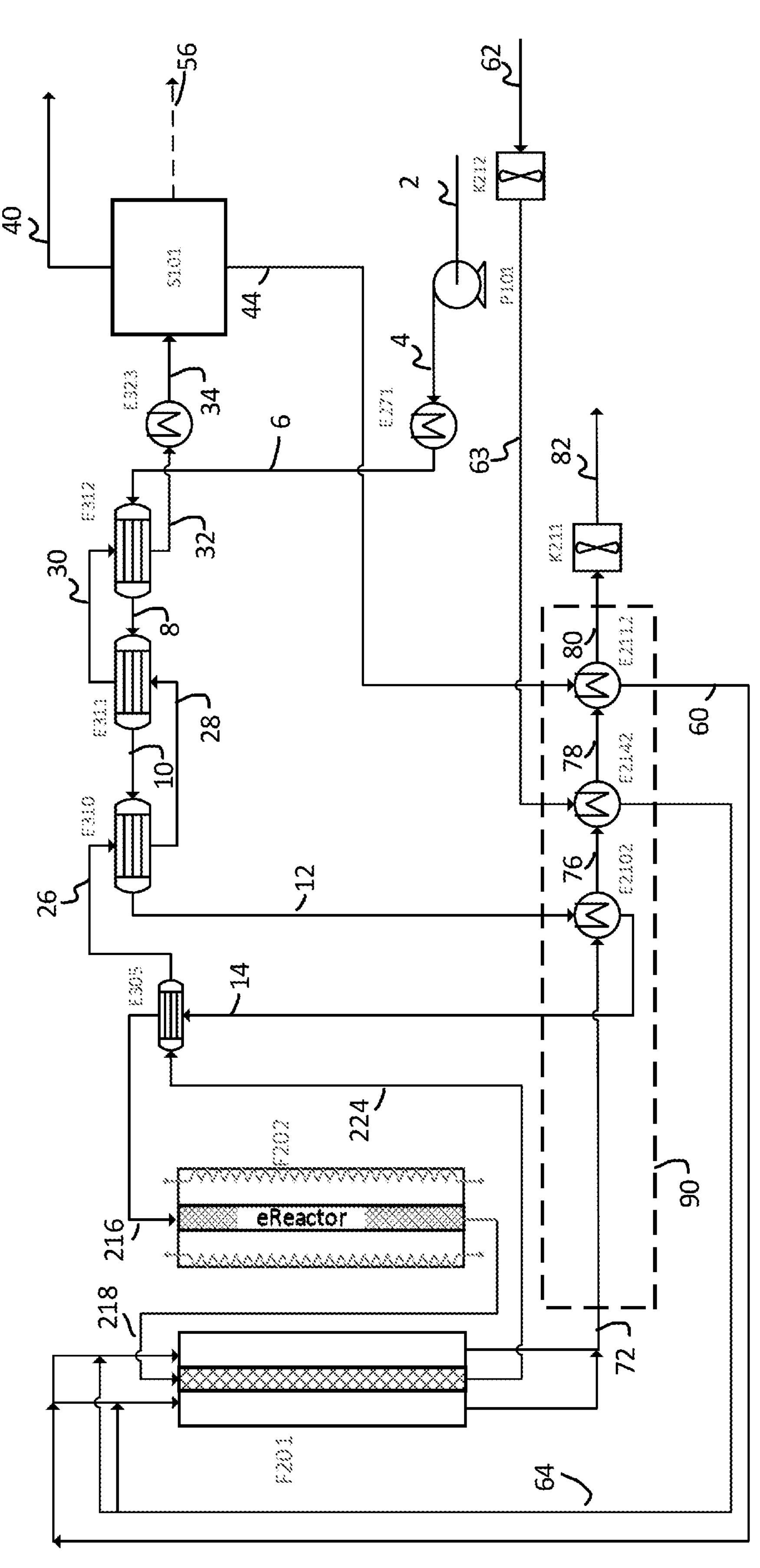
FIG. 2 is a simplified flowsheet of a first embodiment of the process according to the present invention without offgas cracking.

FIG. 2 depicts a process according to the present invention in which the offgas is used in the fired reactor F201 without cracking. The processes of FIGS. 1 and 2 have many features in common and, for convenience, the same reference numerals have been used to identify these features. The following is a discussion of the different features of the process in FIG. 2.

Stream 14 of superheated ammonia gas at about 312° C. is further heated by heat exchange in heat exchanger (or "economizer") E305 to produce further heated ammonia gas at about 500° C. which is fed as stream 216 at a pressure of about 47 bar to catalyst-filled tubes of an electrically heated reactor F202 where part of the ammonia in the gas is cracked into hydrogen gas and nitrogen gas. In this embodiment, the tubes in the electrically heated reactor F202 are filled with a nickel-based catalyst.

A stream 218 of partially cracked ammonia gas exits the electrically reactor F202 at about 634° C. and then is fed to catalyst-filled tubes of a fired reactor F201 where the rest of the cracking of the ammonia in the gas takes place. In this embodiment, the tubes in the fired reactor F201 are filled with the same nickel-based catalyst used in the tubes of the electrically heated reactor F202.

The reactor F201 is sized to consume the available fuel from the PSA offgas in stream 60. No other fuel (including natural gas) is used in this embodiment to fire the reactor F201.

Cracked gas exits the fired reactor F201 at about 626° C. and is then fed first as stream 224 to the heat exchanger E305 to provide the duty required to heat the superheated ammonia gas in stream 14.

The PSA system S101 comprises the PSA unit U501 (not shown) with or without the PSA compressor K681 (not shown). If the PSA system S101 does not comprise the PSA compressor K681, then stream 44 will comprise all of the PSA offgas. In other embodiments in which the PSA system S101 includes the PSA compressor K681, then the PSA offgas will be split into two portions as in FIG. 1 with the first portion being sent via steam 44 to the fired reactor F201 and the second portion being recompressed in PSA compressor K681 and recycled to the PSA unit U501 for recovery of further hydrogen. In the latter embodiments, there may be a stream 56 of condensate generated from the cooling of the compressed gas in E6816A-E (not shown) and separation in phase separator C6816 (not shown).

FIG. 3 depicts a process according to the present invention in which the offgas is used in the fired reactor F201 after cracking. The processes of FIGS. 1 to 3 have many features in common and, for convenience, the same reference numerals have been used to identify the common features. The following is a discussion of the different features of the process in FIG. 3.

Stream 44 of PSA offgas is heated by heat exchange with flue gas in heat exchanger E2112 in the convection section 90 of the fired reactor F201 to produce a stream 360 of heated offgas at about 197° C. The heated offgas is further heated by heat exchange with flue gas in heat exchanger E2000 located upstream of heat exchanger E2112 (with respect to the flow of flue gas) in the convection section 90 of the fired reactor F201 to produce a stream 362 of further heated offgas at about 595° C.

The further heated offgas is fed to an adiabatic reactor C140 and passed through a bed of nickel-based catalyst where most, e.g., about 92%, of the residual ammonia is cracked into additional hydrogen and nitrogen to form a stream 364 of cracked offgas which is then fed as the fuel to the fired reactor F201.

Finally, it should be noted that heat exchangers E2112 and E2142 have swapped positions in the flowsheet of FIG. 3 compared with FIGS. 1 & 2 in order to demonstrate an alternative heat integration scheme that may provide more efficient heat integration for the illustrated process as it allows the PSA offgas to be heated to a higher temperature against the flue gas in E2112.

Figure 4:
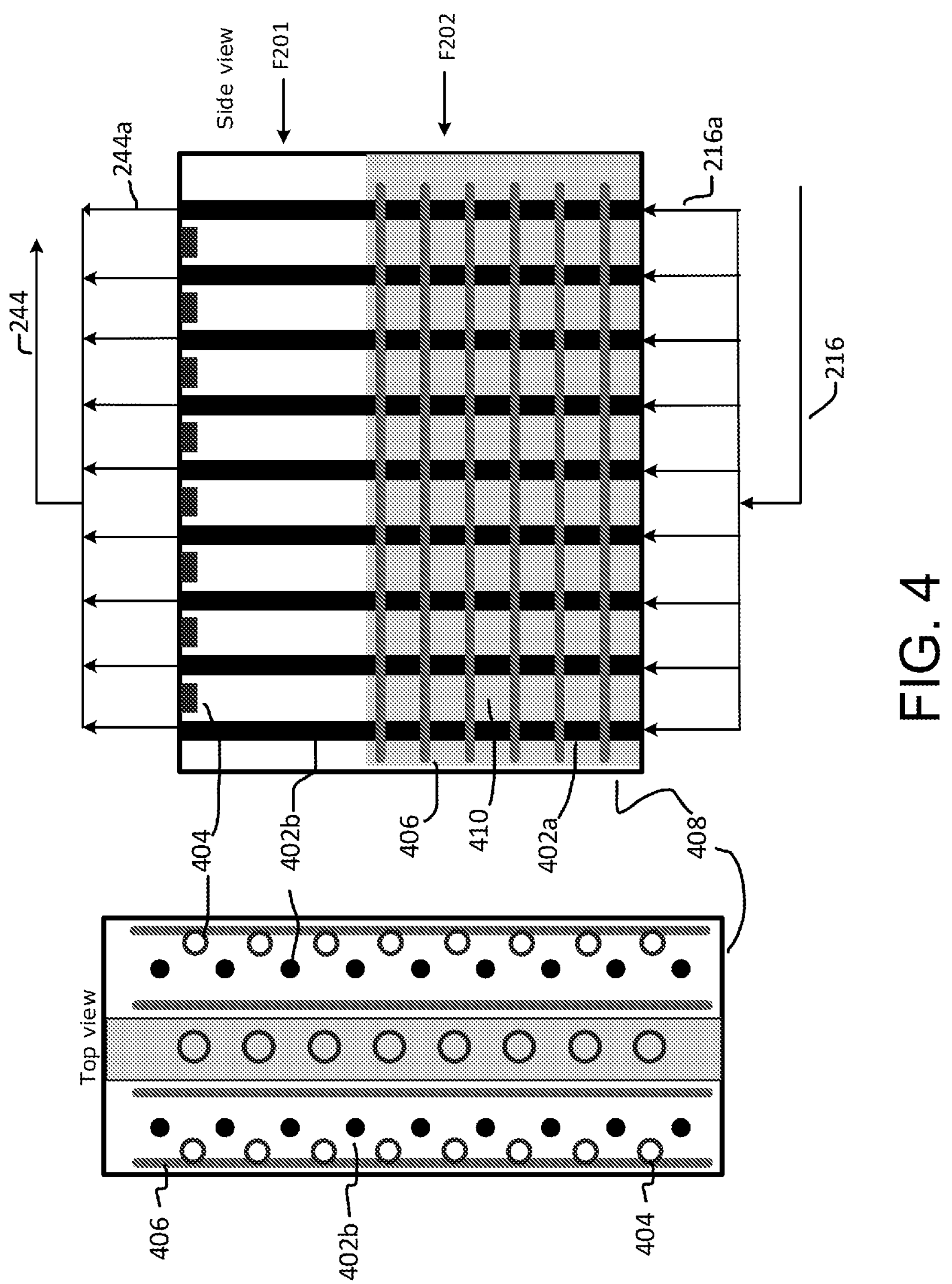
FIG. 4 is a simplified drawing of top and side views of a first arrangement of a combination of electrically heated reactor and fired reactor for use in the present invention.

FIG. 4 depicts one arrangement of a fired reactor F201 and an electrically heated reactor F202 provided within a single thermally insulated unit 408.

Stream 216 of heated ammonia gas at super-atmospheric pressure is depicted for convenience as divided into a series 216*a* of smaller streams feeding a single set of catalyst-containing reactor tubes 402*a*/402*b*. The reactor tubes have two sections, a first section 402*a* and a second section 402*b* located downstream of the first section 402*a*. The first section 402*a* of the tubes is located in the electrically heated reactor F202 and the second section 402*b* of the tubes is located in the fired reactor F201.

Resistive heating elements 406 are located within the electrically heater reactor F202 and heat the first section 402*a* of the tubes. A dividing wall 410 separates one half of the catalysts-filled tubes in the first section 402*a* from the other half of the tubes in the first section 402*a* and supports resistive heating elements located between rows of tubes. Burners 404 are located at the top of the fired reactor F201 and heat the second section 402*b* of the tubes.

The heated ammonia gas is partially cracked in the first section 402*a* of the reactor tubes and the partially cracked gas passes directly into the second section 402*b* of the reactor tubes where further ammonia is cracked to produce cracked gas.

Streams 224*a* of cracked gas are depicted for convenience as collected from the downstream ends of the reactor tubes 402*a*/402*b* and combined to form stream 224 of cracked gas.

Figure 5:
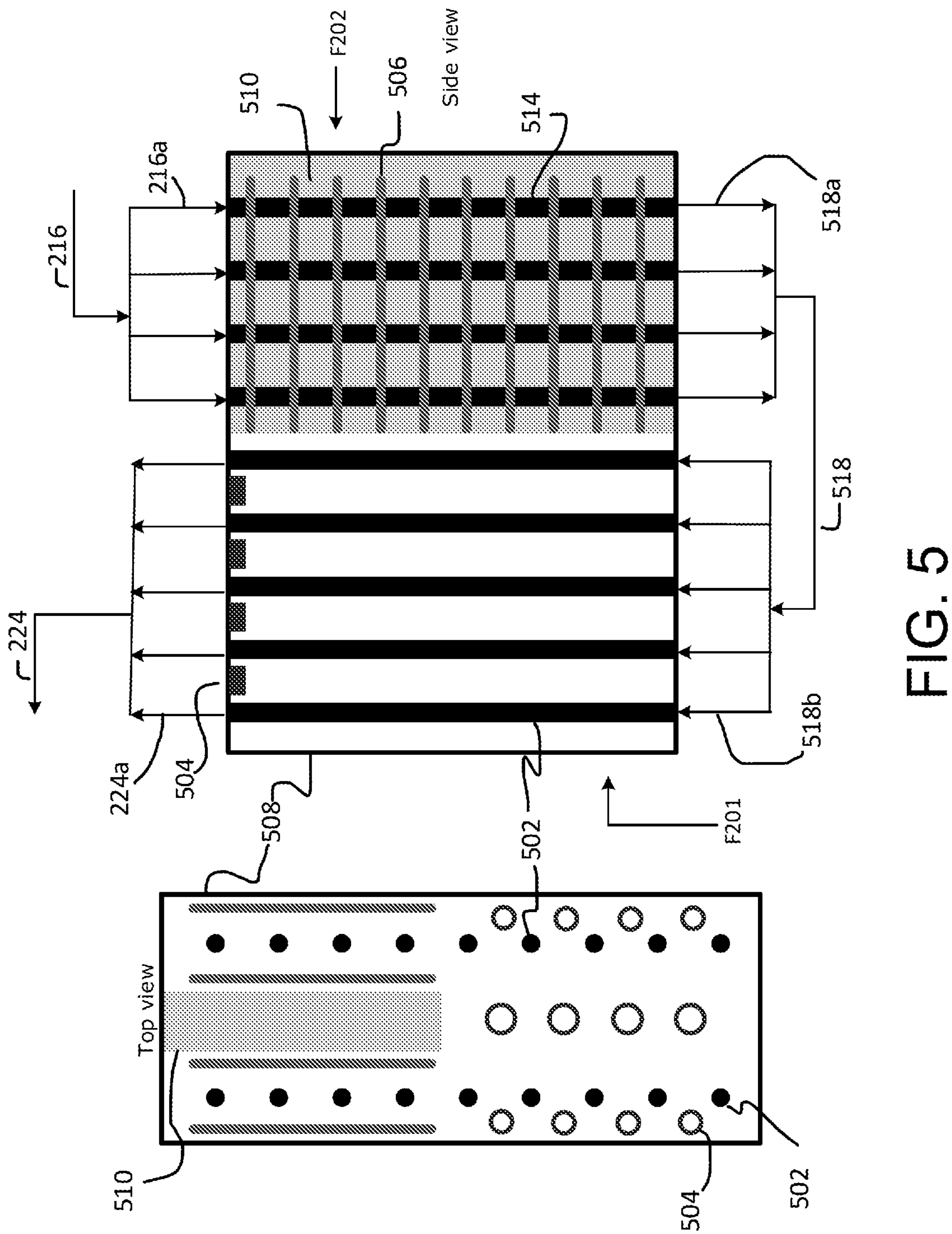
FIG. 5 is a simplified drawing of top and side views of a second arrangement of a combination of electrically heated reactor and fired reactor for use in the present invention.

FIG. 5 depicts another arrangement of a fired reactor F201 and an electrically heated reactor F202 provided within a single thermally insulated unit 508.

Stream 216 of heated ammonia gas at super-atmospheric pressure is depicted for convenience as divided into a series 216*a* of smaller streams feeding catalyst-containing reactor tubes 514 in the electrically heated reactor F202. Resistive heating elements 506 are located within the electrically heated reactor F202 and heat the reactor tubes 514. A dividing wall 510 separates one half of reactor tubes 514 from the other half of the tubes 514 and supports resistive heating elements 506 located between rows of tubes 514.

Streams 518*a* of partially cracked ammonia gas are depicted for convenience as collected from the downstream ends of the reactor tubes 514 and combined to form stream 518 of partially cracked ammonia gas. Stream 512 is depicted for convenience as divided into a series 518*b* of smaller streams feeding catalyst-containing reactor tubes 502 of the fired reactor F201.

Burners 504 are located at the top of the fired reactor F201 and heat the reactor tubes 502. The partially cracked ammonia gas is cracked in the tubes 502 of the fired reactor F201 to produce cracked gas which is depicted for convenience as collected from the downstream ends of the reactor tubes 502 as streams 224*a* and combined to form stream 224.

The present invention will now be illustrated by the following non-limiting examples.

REFERENCE EXAMPLE

The process depicted in FIG. 1 has been simulated by computer (Aspen Plus, ver. 10, Aspen Technology, Inc., Massachusetts, USA) for a plant designed to produce 30 tonnes/day hydrogen (stream 40). The ammonia slip was 1.33 mol. % and hydrogen recovery was 95%.

The activities of the ruthenium-based catalyst and nickel-based catalyst in the adiabatic reactors and in the tubes were modelled using rate equation No. 9 given in Lamb et al (Int. J. Hydrogen Energy, 44 (2019) pp 3726-3736) as a basis. For the purpose of the simulation, it was assumed that the activity of the ruthenium-based catalyst conformed to the rate equation but that the activity of the nickel-based catalyst was 20% of that predicted by the rate equation.

The results are depicted in Table 2.

TABLE 2

| Composition, mol % | 2 | 4 | 6 | 12 | 14 | 16 | 18 | 20 | 22 | 24 |
|---|---|---|---|---|---|---|---|---|---|---|
| Hydrogen | 0.00 | 0.00 | 0.00 | 0.00 | 0.00 | 7.75 | 7.75 | 29.83 | 29.83 | 73.93 |
| Nitrogen | 0.00 | 0.00 | 0.00 | 0.00 | 0.00 | 2.58 | 2.58 | 9.94 | 9.94 | 24.64 |
| Ammonia | 99.81 | 99.81 | 99.81 | 99.81 | 99.81 | 89.49 | 89.49 | 60.07 | 60.07 | 1.33 |
| Water | 0.19 | 0.19 | 0.19 | 0.19 | 0.19 | 0.18 | 0.18 | 0.15 | 0.15 | 0.10 |
| Oxygen | 0.00 | 0.00 | 0.00 | 0.00 | 0.00 | 0.00 | 0.00 | 0.00 | 0.00 | 0.00 |
| Argon | 0.00 | 0.00 | 0.00 | 0.00 | 0.00 | 0.00 | 0.00 | 0.00 | 0.00 | 0.00 |
| Carbon Dioxide | 0.00 | 0.00 | 0.00 | 0.00 | 0.00 | 0.00 | 0.00 | 0.00 | 0.00 | 0.00 |
| Methane | 0.00 | 0.00 | 0.00 | 0.00 | 0.00 | 0.00 | 0.00 | 0.00 | 0.00 | 0.00 |
| Ethane | 0.00 | 0.00 | 0.00 | 0.00 | 0.00 | 0.00 | 0.00 | 0.00 | 0.00 | 0.00 |
| Pentane | 0.00 | 0.00 | 0.00 | 0.00 | 0.00 | 0.00 | 0.00 | 0.00 | 0.00 | 0.00 |
| Butane | 0.00 | 0.00 | 0.00 | 0.00 | 0.00 | 0.00 | 0.00 | 0.00 | 0.00 | 0.00 |
| Pentane | 0.00 | 0.00 | 0.00 | 0.00 | 0.00 | 0.00 | 0.00 | 0.00 | 0.00 | 0.00 |
| Ethylene Glycol | 0.00 | 0.00 | 0.00 | 0.00 | 0.00 | 0.00 | 0.00 | 0.00 | 0.00 | 0.00 |
| Flowrate, kmol/hr | 447.7 | 447.7 | 447.7 | 447.7 | 447.7 | 472.1 | 472.1 | 558.9 | 558.9 | 882.9 |
| Flowrate, kg/hr | 7626 | 7626 | 7626 | 7626 | 7626 | 7626 | 7626 | 7626 | 7626 | 7626 |
| Pressure, bar (a) | 1.0 | 46.4 | 46.0 | 44.8 | 42.8 | 41.3 | 40.3 | 38.8 | 38.4 | 35.4 |

TABLE 2-continued

| Temperature, ° C. | −33.7 | −32.2 | 53.0 | 260.0 | 420.0 | 357.0 | 590.0 | 387.0 | 500.0 | 639.9 |
|---|---|---|---|---|---|---|---|---|---|---|
| Composition, mol % | 26 | 34 | 44 | 40 | 60 | 70 | 64 | 72 | 76 | 82 |
| Hydrogen | 73.93 | 73.93 | 12.42 | 100.00 | 12.42 | 0.00 | 0.00 | 0.00 | 0.00 | 0.00 |
| Nitrogen | 24.64 | 24.64 | 82.78 | 0.00 | 82.78 | 1.00 | 77.27 | 78.53 | 78.53 | 78.53 |
| Ammonia | 1.33 | 1.33 | 4.48 | 0.00 | 4.48 | 0.00 | 0.00 | 0.00 | 0.00 | 0.00 |
| Water | 0.10 | 0.10 | 0.32 | 0.00 | 0.32 | 0.00 | 1.05 | 15.69 | 15.69 | 15.69 |
| Oxygen | 0.00 | 0.00 | 0.00 | 0.00 | 0.00 | 0.00 | 20.73 | 1.15 | 1.15 | 1.15 |
| Argon | 0.00 | 0.00 | 0.00 | 0.00 | 0.00 | 0.00 | 0.92 | 0.56 | 0.56 | 0.56 |
| Carbon Dioxide | 0.00 | 0.00 | 0.00 | 0.00 | 0.00 | 0.50 | 0.03 | 4.07 | 4.07 | 4.07 |
| Methane | 0.00 | 0.00 | 0.00 | 0.00 | 0.00 | 93.96 | 0.00 | 0.00 | 0.00 | 0.00 |
| Ethane | 0.00 | 0.00 | 0.00 | 0.00 | 0.00 | 4.20 | 0.00 | 0.00 | 0.00 | 0.00 |
| Pentane | 0.00 | 0.00 | 0.00 | 0.00 | 0.00 | 0.30 | 0.00 | 0.00 | 0.00 | 0.00 |
| Butane | 0.00 | 0.00 | 0.00 | 0.00 | 0.00 | 0.02 | 0.00 | 0.00 | 0.00 | 0.00 |
| Pentane | 0.00 | 0.00 | 0.00 | 0.00 | 0.00 | 0.02 | 0.00 | 0.00 | 0.00 | 0.00 |
| Ethylene Glycol | 0.00 | 0.00 | 0.00 | 0.00 | 0.00 | 0.00 | 0.00 | 0.00 | 0.00 | 0.00 |
| Flowrate, kmol/hr | 882.9 | 882.9 | 262.8 | 620.0 | 262.8 | 27.8 | 435.1 | 713.1 | 713.1 | 713.1 |
| Flowrate, kg/hr | 7626 | 7626 | 6376 | 1250 | 6376 | 472.7 | 12553 | 19402 | 19402 | 19402 |
| Pressure, bar (a) | 35.0 | 33.4 | 1.4 | 32.7 | 1.2 | 5.0 | 1.1 | 1.0 | 1.0 | 1.0 |
| Temperature, ° C. | 530.1 | 50.0 | 35.0 | 50.0 | 138.0 | 30.0 | 236.7 | 685.9 | 304.4 | 131.8 |

The results indicate that, with a 1.33 mol. % ammonia slip (stream 24) from the cracker (tube furnace 201) and 95 mol. % recovery of hydrogen in the PSA, 7626 kg/h of ammonia is required (stream 2) as feed, together with 472.7 kg/h of natural gas (stream 70) as fuel in addition to the PSA offgas (stream 60) in order to fire the cracker.

Example 1

The process depicted in FIG. 2 has been simulated by computer (Aspen Plus, ver. 10, Aspen Technology, Inc., Massachusetts, USA) for a plant designed to produce 35 tonnes/day hydrogen (stream 40). The ammonia slip was 1.33 mol. % and hydrogen recovery was 95%.

The activity of the nickel-based catalyst used in the tubes of the fired reactor F201 and the tubes of the electrically heated reactor F202 was modelled using rate equation No. 9 given in Lamb et al (as above) as a basis. For the purpose of the simulation, it was assumed that the activity of the nickel-based catalyst was 20% of that predicted by the rate equation.

The results are depicted in Table 3.

TABLE 3

| Composition, mol % | 2 | 4 | 6 | 8 | 10 | 12 | 14 | 216 | 218 |
|---|---|---|---|---|---|---|---|---|---|
| Hydrogen | 0.00 | 0.00 | 0.00 | 0.00 | 0.00 | 0.00 | 0.00 | 0.00 | 61.7 |
| Nitrogen | 0.00 | 0.00 | 0.00 | 0.00 | 0.00 | 0.00 | 0.00 | 0.00 | 20.6 |
| Ammonia | 99.8 | 99.8 | 99.8 | 99.8 | 99.8 | 99.8 | 99.8 | 99.8 | 17.7 |
| Water | 0.2 | 0.2 | 0.2 | 0.2 | 0.2 | 0.2 | 0.2 | 0.2 | 0.1 |
| Oxygen | 0.00 | 0.00 | 0.00 | 0.00 | 0.00 | 0.00 | 0.00 | 0.00 | 0.00 |
| Argon | 0.00 | 0.00 | 0.00 | 0.00 | 0.00 | 0.00 | 0.00 | 0.00 | 0.00 |
| Carbon Dioxide | 0.00 | 0.00 | 0.00 | 0.00 | 0.00 | 0.00 | 0.00 | 0.00 | 0.00 |
| Flowrate, kmol/hr | 523.1 | 523.1 | 523.1 | 523.1 | 523.1 | 523.1 | 523.1 | 523.1 | 888.3 |
| Flowrate, kg/hr | 8909 | 8909 | 8909 | 8909 | 8909 | 8909 | 8909 | 8909 | 8909 |
| Pressure, bar (a) | 1.00 | 48.0 | 47.6 | 47.2 | 46.8 | 46.8 | 46.8 | 46.8 | 43.3 |
| Temperature, ° C. | −33.7 | −32.1 | 53.0 | 76.6 | 93.9 | 202.5 | 312.3 | 500.0 | 633.7 |

| Composition, mol % | 224 | 26 | 28 | 30 | 32 | 34 | 44 | 40 |
|---|---|---|---|---|---|---|---|---|
| Hydrogen | 73.9 | 73.9 | 73.9 | 73.9 | 73.9 | 73.9 | 12.4 | 100.0 |
| Nitrogen | 24.6 | 24.6 | 24.6 | 24.6 | 24.6 | 24.6 | 82.6 | 0.0 |
| Ammonia | 1.4 | 1.4 | 1.4 | 1.4 | 1.4 | 1.4 | 4.7 | 0.0 |
| Water | 0.1 | 0.1 | 0.1 | 0.1 | 0.1 | 0.1 | 0.3 | 0.0 |
| Oxygen | 0.0 | 0.0 | 0.0 | 0.0 | 0.0 | 0.0 | 0.0 | 0.0 |
| Argon | 0.0 | 0.0 | 0.0 | 0.0 | 0.0 | 0.0 | 0.0 | 0.0 |
| Carbon Dioxide | 0.0 | 0.0 | 0.0 | 0.0 | 0.0 | 0.0 | 0.0 | 0.0 |
| Flowrate, kmol/hr | 1031 | 1031 | 1031 | 1031 | 1031 | 1031 | 307.3 | 723.4 |

TABLE 3-continued

| | | | | | | | | | |
|---|---|---|---|---|---|---|---|---|---|
| Flowrate, kg/hr | 8909 | 8909 | 8909 | 8909 | 8909 | 8909 | 7451 | 1458 | |
| Pressure, bar (a) | 38.3 | 38.3 | 37.9 | 37.5 | 37.1 | 36.7 | 1.4 | 36.0 | |
| Temperature, ° C. | 625.9 | 471.2 | 372.5 | 95.1 | 56.7 | 50.0 | 35.0 | 50.0 | |

| Composition, mol % | 60 | 62 | 63 | 64 | 72 | 76 | 78 | 80 | 82 |
|---|---|---|---|---|---|---|---|---|---|
| Hydrogen | 12.4 | 0.0 | 0.0 | 0.0 | 0.0 | 0.0 | 0.0 | 0.0 | 0.0 |
| Nitrogen | 82.6 | 76.6 | 76.6 | 76.6 | 84.9 | 84.9 | 84.9 | 84.9 | 84.9 |
| Ammonia | 4.7 | 0.0 | 0.0 | 0.0 | 0.0 | 0.0 | 0.0 | 0.0 | 0.0 |
| Water | 0.3 | 1.9 | 1.9 | 1.9 | 14.1 | 14.1 | 14.1 | 14.1 | 14.1 |
| Oxygen | 0.0 | 20.6 | 20.6 | 20.6 | 0.7 | 0.7 | 0.7 | 0.7 | 0.7 |
| Argon | 0.0 | 0.9 | 0.9 | 0.9 | 0.3 | 0.3 | 0.3 | 0.3 | 0.3 |
| Carbon Dioxide | 0.00 | 0.0 | 0.0 | 0.0 | 0.0 | 0.0 | 0.0 | 0.0 | 0.0 |
| Flowrate, kmol/hr | 307.3 | 159.6 | 159.6 | 159.6 | 451.5 | 451.5 | 451.5 | 451.5 | 451.5 |
| Flowrate, kg/hr | 7451 | 4589 | 4589 | 4589 | 12040 | 12040 | 12040 | 12040 | 12040 |
| Pressure, bar (a) | 1.4 | 1.0 | 1.1 | 1.0 | 1.0 | 1.0 | 1.0 | 1.0 | 1.0 |
| Temperature, ° C. | 295.4 | 20.0 | 24.3 | 438.3 | 642.7 | 458.3 | 315.4 | 137.5 | 140.5 |

The results indicate that, with a 1.33 mol. % ammonia slip (stream 224) from the electrically heated reactor F202 and 95% recovery of hydrogen in the PSA, the process is able to crack 8909 kg/h of ammonia using only the PSA offgas in the fired reactor F201, together with an electrically fired reactor F202.

Table 4 shows the breakdown of process and electrical carbon intensity (CI) and how these figures change with grid electrical CI for the processes depicted in FIGS. 1 and 2.

TABLE 4

| | Units | FIG. 1 | FIG. 2 |
|---|---|---|---|
| At 240 $gCO_2/kWh$ Electrical Grid | | | |
| Direct $CO_2$ emissions | kg/hr | 1272 | 0 |
| Hydrogen produced | kg/hr | 1250 | 1458 |
| Electricity consumption | MW | 1.4 | 7.8 |
| Carbon Intensity from combustion | $kgCO_2/MJ\ H_2$ | 8.5 | 0 |
| Carbon Intensity from electricity | $kgCO_2/MJ\ H_2$ | 2.3 | 10.7 |
| Total cracker Carbon Intensity | $kgCO_2/MJ\ H_2$ | 10.8 | 10.7 |
| At 190 $gCO_2/kWh$ Electrical Grid | | | |
| Direct $CO_2$ emissions | kg/hr | 1272 | 0 |
| Hydrogen produced | kg/hr | 1250 | 1458 |
| Electricity consumption | MW | 1.4 | 7.8 |
| Carbon Intensity from combustion | $kgCO_2/MJ\ H_2$ | 8.5 | 0 |

TABLE 4-continued

| | Units | FIG. 1 | FIG. 2 |
|---|---|---|---|
| Carbon Intensity from electricity | $kgCO_2/MJ\ H_2$ | 1.8 | 8.5 |
| Total cracker Carbon Intensity | $kgCO_2/MJ\ H_2$ | 10.3 | 8.5 |

From these figures, it may be concluded that, at 190 $gCO_2/kWh$, the process according to the present invention (FIG. 2) has a significantly lower total cracker carbon intensity (8.5 $kgCO_2/MJ\ H_2$ compared with 10.3 $kgCO_2/MJ\ H_2$) than the reference process (FIG. 1). Indeed, even at 240 $gCO_2/kWh$, the total cracker carbon intensity of both cycles is about equal.

Example 2

The process depicted in FIG. 3 has been simulated by computer (Aspen Plus, ver. 10, Aspen Technology, Inc., Massachusetts, USA) for a plant designed to produce 35 tonnes/day hydrogen (stream 40).

The activity of the nickel-based catalyst used in the tubes of the fired reactor F201, the tubes of the electrically heated reactor F202 and in the adiabatic reactor C140 was modelled using rate equation No. 9 given in Lamb et al (as above) as a basis. For the purpose of the simulation, it was assumed that the activity of the nickel-based catalyst was 20% of that predicted by the rate equation.

The results are depicted in Table 5.

TABLE 5

| Composition, mol % | 2 | 4 | 6 | 8 | 10 | 12 | 14 | 216 | 218 | 224 |
|---|---|---|---|---|---|---|---|---|---|---|
| Hydrogen | 0.0 | 0.0 | 0.0 | 0.0 | 0.0 | 0.0 | 0.0 | 0.0 | 61.8 | 74.0 |
| Nitrogen | 0.0 | 0.0 | 0.0 | 0.0 | 0.0 | 0.0 | 0.0 | 0.0 | 20.6 | 24.7 |
| Ammonia | 99.8 | 99.8 | 99.8 | 99.8 | 99.8 | 99.8 | 99.8 | 99.8 | 17.5 | 1.3 |
| Water | 0.2 | 0.2 | 0.2 | 0.2 | 0.2 | 0.2 | 0.2 | 0.2 | 0.1 | 0.1 |
| Oxygen | 0.0 | 0.0 | 0.0 | 0.0 | 0.0 | 0.0 | 0.0 | 0.0 | 0.0 | 0.0 |
| Argon | 0.0 | 0.0 | 0.0 | 0.0 | 0.0 | 0.0 | 0.0 | 0.0 | 0.0 | 0.0 |
| Carbon Dioxide | 0.0 | 0.0 | 0.0 | 0.0 | 0.0 | 0.0 | 0.0 | 0.0 | 0.0 | 0.0 |
| Flowrate, kmol/hr | 521.7 | 521.7 | 521.7 | 521.7 | 521.7 | 521.7 | 521.7 | 521.7 | 887.4 | 1029 |

TABLE 5-continued

| | | | | | | | | | | |
|---|---|---|---|---|---|---|---|---|---|---|
| Flowrate, kg/hr | 8886 | 8886 | 8886 | 8886 | 8886 | 8886 | 8886 | 8886 | 8888 | 8888 |
| Pressure, bar (a) | 1.0 | 48.0 | 47.6 | 47.2 | 46.8 | 46.8 | 46.8 | 46.8 | 43.3 | 38.3 |
| Temperature, ° C. | −33.7 | −32.1 | 53.0 | 76.6 | 93.9 | 202.5 | 284.8 | 500.0 | 634.1 | 647.3 |

| Composition, mol % | 26 | 28 | 30 | 32 | 34 | 44 | 40 | 360 | 362 | 364 |
|---|---|---|---|---|---|---|---|---|---|---|
| Hydrogen | 74.0 | 74.0 | 74.0 | 74.0 | 74.0 | 12.4 | 100.0 | 12.4 | 12.4 | 17.6 |
| Nitrogen | 24.7 | 24.7 | 24.7 | 24.7 | 24.7 | 83.0 | 0.0 | 83.0 | 83.0 | 81.7 |
| Ammonia | 1.3 | 1.3 | 1.3 | 1.3 | 1.3 | 4.3 | 0.0 | 4.3 | 4.3 | 0.4 |
| Water | 0.1 | 0.1 | 0.1 | 0.1 | 0.1 | 0.3 | 0.0 | 0.3 | 0.3 | 0.3 |
| Oxygen | 0.0 | 0.0 | 0.0 | 0.0 | 0.0 | 0.0 | 0.0 | 0.0 | 0.0 | 0.0 |
| Argon | 0.0 | 0.0 | 0.0 | 0.0 | 0.0 | 0.0 | 0.0 | 0.0 | 0.0 | 0.0 |
| Carbon Dioxide | 0.0 | 0.0 | 0.0 | 0.0 | 0.0 | 0.0 | 0.0 | 0.0 | 0.0 | 0.0 |
| Flowrate, kmol/hr | 1029 | 1029 | 1029 | 1029 | 1029 | 306.0 | 723.4 | 306.0 | 306.0 | 317.9 |
| Flowrate, kg/hr | 8886 | 8886 | 8886 | 8886 | 8886 | 7427 | 1458 | 7427 | 7427 | 7427 |
| Pressure, bar (a) | 38.3 | 37.9 | 37.5 | 37.1 | 36.7 | 1.4 | 36.0 | 1.4 | 1.4 | 1.2 |
| Temperature, ° C. | 471.2 | 372.5 | 95.3 | 56.9 | 50.0 | 35.0 | 50.0 | 196.5 | 595.0 | 530.0 |

| Composition, mol % | 62 | 63 | 64 | 72 | 76 | 78 | 80 | 82 |
|---|---|---|---|---|---|---|---|---|
| Hydrogen | 0.0 | 0.0 | 0.0 | 0.0 | 0.0 | 0.0 | 0.0 | 0.0 |
| Nitrogen | 76.6 | 76.6 | 76.6 | 85.2 | 85.2 | 85.2 | 85.2 | 85.2 |
| Ammonia | 0.0 | 0.0 | 0.0 | 0.0 | 0.0 | 0.0 | 0.0 | 0.0 |
| Water | 1.9 | 1.9 | 1.9 | 13.9 | 13.9 | 13.9 | 13.9 | 13.9 |
| Oxygen | 20.6 | 20.6 | 20.6 | 0.7 | 0.7 | 0.7 | 0.7 | 0.7 |
| Argon | 0.9 | 0.9 | 0.9 | 0.3 | 0.3 | 0.3 | 0.3 | 0.3 |
| Carbon Dioxide | 0.0 | 0.0 | 0.0 | 0.0 | 0.0 | 0.0 | 0.0 | 0.0 |
| Flowrate, kmol/hr | 154.1 | 154.1 | 154.1 | 444.2 | 444.2 | 444.2 | 444.2 | 444.2 |
| Flowrate, kg/hr | 4431 | 4431 | 4431 | 11859 | 11859 | 11859 | 11859 | 11859 |
| Pressure, bar (a) | 1.0 | 1.1 | 1.0 | 1.0 | 1.0 | 1.0 | 1.0 | 1.0 |
| Temperature, ° C. | 20.0 | 24.3 | 156.2 | 694.9 | 286.8 | 176.2 | 130.6 | 132.3 |

The results indicate that, with a 1.33 mol. % ammonia slip (stream 224) from the electrically heated reactor F202 and 95% recovery of hydrogen in the PSA, the process is able to crack 8880 kg/h of ammonia using only the cracked PSA offgas in the fired reactor F201, together with an electrically fired reactor F202.

While the invention has been described with reference to the preferred embodiments depicted in the figure, it will be appreciated that various modifications are possible within the spirit or scope of the invention as defined in the following claims.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" and incorporates "consisting of" rather than meaning "consisting of" exclusively.

All prior teachings above are hereby incorporated herein by reference. No acknowledgement of any prior published document herein should be taken to be an admission or representation that the teaching thereof was common general knowledge in Australia or elsewhere at the date thereof.

The invention claimed is:

1. A process for cracking ammonia comprising:

providing a heated ammonia gas at super-atmospheric pressure;

passing the heated ammonia gas, or a fractionally cracked ammonia gas derived therefrom, over a first catalyst in an electrically heated reactor to cause cracking of ammonia and produce a partially cracked ammonia gas comprising hydrogen gas and nitrogen gas;

combusting a fuel with an oxidant gas to heat reactor tubes containing a second catalyst in a fired reactor to produce a flue gas;

feeding the partially cracked ammonia gas to the reactor tubes in the fired reactor to cause cracking of further ammonia and produce a cracked gas comprising hydrogen gas, nitrogen gas and residual ammonia gas;

cooling the cracked gas to provide cooled cracked gas; and recovering hydrogen from the cooled cracked gas to produce a hydrogen gas product and an offgas comprising nitrogen gas, residual hydrogen gas and residual ammonia gas, wherein the offgas, or a cracked offgas derived therefrom, is used as at least part of the fuel combusted with the oxidant gas.

2. The process of claim 1, wherein the partially cracked ammonia gas is fed directly from the electrically heated reactor to the reactor tubes of the fired reactor.

3. The process of claim 1, wherein the partially cracked ammonia gas has a mole fraction of ammonia in a range from about 5 mol. % to about 50 mol. %, or from about 10 mol. % to about 30 mol. %, or from about 15 mol. % to about 20 mol. %.

4. The process of claim 1, wherein the cracked gas has a mole fraction of ammonia in a range from 0.1 mol. % to about 5 mol. %, or from about 1 mol. % to about 2 mol. %, or about 1.3 mol. % to about 1.5 mol. %.

5. The process of claim 1, wherein from about 20% to about 80%, or from about 25% to about 50%, or from about 30% to about 35%, of the energy required in the process to crack the heated ammonia gas is provided by the combustion of the offgas, or of the cracked gas derived therefrom, in the fired reactor.

6. The process of claim 1, wherein the first and second catalysts are identical and from about 20% to about 90%, or from about 50% to about 90%, or from about 50% to about 75%, or from about 55% to about 65%, of the total catalyst volume is located in the electrically heated reactor.

7. The process of claim 1, wherein the heated ammonia gas is cracked in reactor tubes containing the first catalyst.

8. The process of claim 1, wherein the heated ammonia gas, or the fractionally cracked ammonia gas derived therefrom, is passed through a single set of catalyst-containing reactor tubes comprising a first section and a second section located downstream of the first section, wherein the first section of the reactor tubes is heated in the electrically heated reactor and the second section of the reactor tubes is heated in the fired reactor.

9. The process of claim 1, wherein the electrically heated reactor heats radiatively using at least one resistive heating element.

10. The process of claim 1, wherein the offgas, or the cracked offgas gas derived therefrom, provides the entire fuel requirement of the fired reactor.

11. The process of claim 1, wherein the offgas is cracked in an adiabatic reactor comprising at least one catalyst bed to produce the cracked offgas which is then fed as the fuel to the fired reactor.

* * * * *